United States Patent
Entezari et al.

(10) Patent No.: US 12,271,978 B1
(45) Date of Patent: Apr. 8, 2025

(54) CONTENT SYNTHESIS USING GENERATIVE ARTIFICIAL INTELLIGENCE MODEL

(71) Applicant: Stability AI Ltd, London (GB)

(72) Inventors: Rahim Entezari, London (GB); Patrick Esser, London (GB); Robin Rombach, London (GB); Andreas Blattmann, London (GB)

(73) Assignee: Stability AI Ltd, London (GB)

( * ) Notice: Subject to any disclaimer, the term of this patent is extended or adjusted under 35 U.S.C. 154(b) by 0 days.

(21) Appl. No.: 18/882,690

(22) Filed: Sep. 11, 2024

Related U.S. Application Data

(60) Provisional application No. 63/633,020, filed on Apr. 11, 2024, provisional application No. 63/567,127, filed on Mar. 19, 2024.

(51) Int. Cl.
  *G06F 40/00* (2020.01)
  *G06F 40/40* (2020.01)
  *G06T 11/00* (2006.01)

(52) U.S. Cl.
  CPC .............. *G06T 11/00* (2013.01); *G06F 40/40* (2020.01)

(58) Field of Classification Search
  None
  See application file for complete search history.

(56) References Cited

U.S. PATENT DOCUMENTS

2022/0114698 A1* 4/2022 Liu ........................... G06T 3/04

OTHER PUBLICATIONS

"Autofaiss", Documentation and code repository for creating Faiss KNN indices; Available online at: https://github.com/criteo/autofaiss, 2023.
"Ideogram v1.0 Announcement", High level description of capabilities of a specific text-to-image model from Ideogram; Available online at: https://about.ideogram.ai/1.0, 2024.
"Playground v2.5 Announcement", Description of a text-to-image model (playground v2.5) with details of techniques used; Available online at: https://blog.playgroundai.com/playground-v2-5/, 2024.
Albergo et al., "Building Normalizing Flows with Stochastic Interpolants", Available Online at: https://arxiv.org/pdf/2209.15571, Mar. 9, 2023, pp. 1-29.

(Continued)

*Primary Examiner* — Martin Mushambo
(74) *Attorney, Agent, or Firm* — Kilpatrick Townsend & Stockton LLP

(57) ABSTRACT

A method including receiving a prompt describing a desired characteristic of an image. The method further including generating, using a set of encoding models, a prompt encoding based on the prompt. The method further including generating, using a first transformer block of a diffusion transformer model, a first prompt embedding and a first image embedding based on the prompt encoding and a noise input. The method further including generating, using a second transformer block of the diffusion transformer model, a second image embedding based on the first image embedding and the first prompt embedding. The method further including generating the image based on the second image embedding.

20 Claims, 11 Drawing Sheets

(56) References Cited

OTHER PUBLICATIONS

Anlatan, "NovelAI Improvements on Stable Diffusion", NovelAI, Available online at: https://blog.novelai.net/novelai-improvements-on-stable-diffusion-e10d38db82ac, Oct. 10, 2022, 18 pages.

Atchison et al., "Logistic-normal Distributions: Some Properties and Uses", Biometrika, vol. 67, No. 2, Aug. 1, 1980, pp. 261-272.

Balaji et al., "eDiff-I: Text-to-image Diffusion Models with an Ensemble of Expert Denoisers", Available Online at: https://arxiv.org/pdf/2211.01324, Mar. 14, 2023, pp. 1-24.

Betker et al., "Improving Image Generation with Better Captions", Computer Science, vol. 2, No. 3, 2023, pp. 1-19.

Blattmann et al., "Align Your Latents: High-resolution Video Synthesis with Latent Diffusion Models", In Proceedings of the Institute of Electrical and Electronics Engineers/Conference on Computer Vision and Pattern Recognition, Dec. 28, 2023, pp. 22563-22575.

Blattmann et al., "Stable Video Diffusion: Scaling Latent Video Diffusion Models to Large Datasets", Available Online at: https://arxiv.org/pdf/2311.15127, Nov. 25, 2023, pp. 1-30.

Brooks et al., "Instructpix2pix: Learning to Follow Image Editing Instructions", In Proceedings of the Institute of Electrical and Electronics Engineers/CVF Conference on Computer Vision and Pattern Recognition, Jan. 18, 2023, pp. 1-15.

Carlini et al., "Extracting Training Data from Diffusion Models", In 32nd USENIX Security Symposium (USENIX Security 23), Aug. 9, 2023, pp. 5253-5270.

Carreira et al., "Quo Vadis, Action Recognition? A New Model and the Kinetics Dataset", Conference on Computer Vision and Pattern Recognition, Jul. 2017, pp. 6299-6308.

Changpinyo et al., "Conceptual 12M: Pushing Web-scale Image-text Pre-training to Recognize Long-tail Visual Concepts", In proceedings of the Institute of Electrical and Electronics Engineers/CVF Conference on Computer Vision and Pattern Recognition, Mar. 30, 2021, pp. 1-16.

Chen et al., "Neural Ordinary Differential Equations", Available Online at: https://arxiv.org/pdf/1806.07366.pdf, Dec. 14, 2019, pp. 1-18.

Chen et al., "PIXART-α: Fast Training of Diffusion Transformer for Photorealistic Text-to-image Synthesis", Available Online at: https://arxiv.org/pdf/2310.00426, Dec. 29, 2023, pp. 1-31.

Cherti et al., "Reproducible Scaling Laws for Contrastive Language-image Learning", In proceedings of the Institute of Electrical and Electronics Engineers/CVF Conference on Computer Vision and Pattern Recognition, 2023, pp. 2818-2829.

Dai et al., "Emu: Enhancing Image Generation Models Using Photogenic Needles in a Haystack", Available Online at: https://arxiv.org/pdf/2309.15807, Sep. 27, 2023, pp. 1-13.

Dao et al., "Flow Matching in Latent Space", Available Online at: https://arxiv.org/pdf/2307.08698, Jul. 17, 2023, pp. 1-34.

Dehghani et al., "Scaling Vision Transformers to 22 Billion Parameters", In International Conference on Machine Learning, Jul. 3, 2023, pp. 7480-7512.

Dhariwal et al., "Diffusion Models Beat GANs on Image Synthesis", Available online at: https://arxiv.org/abs/2105.05233, Jun. 1, 2021, pp. 1-44.

Dockhorn et al., "Genie: Higher-order Denoising Diffusion Solvers", Advances in Neural Information Processing Systems, vol. 35, Dec. 6, 2022, pp. 30150-30166.

Dockhorn et al., "Score-based Generative Modeling with Critically-damped Langevin Diffusion", Available Online at: https://arxiv.org/pdf/2112.07068, Mar. 25, 2022, pp. 1-54.

Dosovitskiy et al., "An Image is Worth 16×16 Words: Transformers for Image Recognition at Scale", Published as a conference paper at International Conference on Learning Representations 2021, Jun. 3, 2021, pp. 1-22.

Esser et al., "Structure and Content-guided Video Synthesis with Diffusion Models", In proceedings of the Institute of Electrical and Electronics Engineers/CVF International Conference on Computer Vision, Feb. 6, 2023, pp. 7346-7356.

Fischer et al., "Boosting Latent Diffusion with Flow Matching", Available Online at: https://arxiv.org/pdf/2312.07360, Mar. 28, 2024, pp. 1-22.

Ghosh et al., "Geneval: An Object-focused Framework for Evaluating Text-to-image Alignment", Advances in Neural Information Processing Systems, vol. 36, Feb. 13, 2024, pp. 1-21.

Gupta et al., "Photorealistic Video Generation with Diffusion Models", Available Online at: https://arxiv.org/pdf/2312.06662, Dec. 11, 2023, 13 pages.

Hessel et al., "CLIPScore: A Reference-free Evaluation Metric for Image Captioning", Proceedings of the 2021 Conference on Empirical Methods in Natural Language Processing, Mar. 23, 2022, 15 pages.

Heusel et al., "GANs Trained by a Two Time-Scale Update Rule Converge to a Local Nash Equilibrium", Proceedings of the 31st International Conference on Neural Information Processing Systems, Dec. 2017, pp. 1-12.

Ho et al., "Classifier-Free Diffusion Guidance", Computer Science, Available online at: https://arxiv.org/pdf/2207.12598, Jul. 26, 2022, pp. 1-14.

Ho et al., "Denoising Diffusion Probabilistic Models", Available online at: https://arxiv.org/pdf/2006.11239, Dec. 16, 2020, pp. 1-25.

Ho et al., "Imagen Video: High Definition Video Generation with Diffusion Models", Computer Vision and Pattern Recognition, Oct. 5, 2022, pp. 1-18.

Hoogeboom et al., "Simple Diffusion: End-to-end Diffusion for High Resolution Images", In International Conference on Machine Learning, Jul. 3, 2023, pp. 13213-13232.

Huang et al., "T2i-compbench: a Comprehensive Benchmark for Open-world Compositional Text-to-image Generation", Advances in Neural Information Processing Systems, vol. 36, Dec. 15, 2023, pp. 78723-78747.

Hyvarinen et al., "Estimation of Non-normalized Statistical Models by Score Matching", Journal of Machine Learning Research, vol. 6, No. 4, Apr. 1, 2005, pp. 695-709.

Kaplan et al., "Scaling Laws for Neural Language Models", Available Online at: https://arxiv.org/pdf/2001.08361, Jan. 23, 2020, pp. 1-30.

Karras et al., "Analyzing and Improving the Training Dynamics of Diffusion Models", In Proceedings of the Institute of Electrical and Electronics Engineers/Conference on Computer Vision and Pattern Recognition, Mar. 20, 2024, pp. 24174-24184.

Karras et al., "Elucidating the Design Space of Diffusion-based Generative Models", Advances in Neural Information Processing Systems, vol. 35, Dec. 6, 2022, pp. 1-13.

Kingma et al., "Understanding Diffusion Objectives as the elbo With Simple Data Augmentation", Advances in Neural Information Processing Systems, vol. 36, Feb. 13, 2024, pp. 1-33.

Lee et al., "Deduplicating Training Data Makes Language Models Better", Available Online at: https://arxiv.org/pdf/2107.06499, Mar. 24, 2022, pp. 1-22.

Lee et al., "Minimizing Trajectory Curvature of Ode-based Generative Models", In International Conference on Machine Learning, Jul. 3, 2023, pp. 18957-18973.

Lin et al., "Common Diffusion Noise Schedules and Sample Steps are Flawed", In Proceedings of the Institute of Electrical and Electronics Engineers/Computer Vision Foundation Winter Conference on Applications of Computer Vision, Jan. 2024, pp. 5404-5411.

Lin et al., "Microsoft COCO: Common Objects in Context", European Conference on Computer Vision, Feb. 21, 2015, pp. 1-15.

Lipman et al., "Flow Matching for Generative Modeling", The Eleventh International Conference on Learning Representations, Feb. 8, 2023, pp. 1-28.

Liu et al., "Flow Straight and Fast: Learning to Generate and Transfer Data with Rectified Flow", Available online at: https://arxiv.org/pdf/2209.03003, Sep. 7, 2022, pp. 1-41.

Liu et al., "Instaflow: One Step is Enough for High-Quality Diffusion-Based Text-to-Image Generation", The Twelfth International Conference on Learning Representations, Sep. 12, 2023, pp. 1-30.

Loshchilov et al., "Fixing Weight Decay Regularization in Adam", Available online at: https://arxiv.org/pdf/1711.05101v2/1000, Feb. 14, 2018, 13 pages.

(56) References Cited

OTHER PUBLICATIONS

Lu et al., "DPM-Solver++: Fast Solver for Guided Sampling of Diffusion Probabilistic Models", Available online at: https://arxiv.org/pdf/2211.01095, May 6, 2023, pp. 1-24.
Ma et al., "SiT: Exploring Flow and Diffusion-based Generative Models with Scalable Interpolant Transformers", Available online at: https://arxiv.org/pdf/2401.08740, Jan. 16, 2024, pp. 1-24.
Nichol , "Dall-e 2 Pre-Training Mitigations", Available online at: https://openai.com/research/dall-e-2-pre-training-mitigations, Jun. 28, 2022, 10 pages.
Nichol et al., "Improved Denoising Diffusion Probabilistic Models", International Conference on Machine Learning, Feb. 18, 2021, pp. 1-17.
Peebles et al., "Scalable Diffusion Models with Transformers", Available online at: https://arxiv.org/pdf/2212.09748, Mar. 2, 2023, pp. 1-25.
Pernias et al., "Wuerstchen: An Efficient Architecture for Large-Scale Text-to-Image Diffusion Models", Available online at: https://arxiv.org/pdf/2306.00637, Sep. 29, 2023, pp. 1-29.
Pizzi et al., "A Self-Supervised Descriptor for Image Copy Detection", In Proceedings of the Institute of Electrical and Electronics Engineers/CVF Conference on Computer Vision and Pattern Recognition, Mar. 25, 2022, pp. 14532-14542.
Po et al., "State of the Art on Diffusion Models for Visual Computing", Available online at: https://arxiv.org/pdf/2310.07204, Oct. 11, 2023, pp. 1-32.
Podell et al., "SDXL: Improving Latent Diffusion Models for High-resolution Image Synthesis", Available online at: https://arxiv.org/pdf/2307.01952, Jul. 4, 2023, pp. 1-21.
Pooladian et al., "Multisample Flow Matching: Straightening Flows with Minibatch Couplings", Available online at: https://arxiv.org/pdf/2304.14772, May 24, 2023, pp. 1-29.
Radford et al., "Learning Transferable Visual Models From Natural Language Supervision", Available online at: https://arxiv.org/pdf/2103.00020, Feb. 26, 2021, pp. 1-48.
Rafailov et al., "Direct Preference Optimization: Your Language Model is Secretly a Reward Model", 37th Conference on Neural Information Processing Systems, vol. 36, Feb. 13, 2024, pp. 1-14.
Raffel et al., "Exploring the Limits of Transfer Learning with a Unified Text-to-Text Transformer", Journal of Machine Learning Research, vol. 21, No. 140, Jun. 2020, pp. 1-67.
Ramesh et al., "Hierarchical Text-Conditional Image Generation with CLIP Latents", Available online at: https://arxiv.org/pdf/2204.06125, Apr. 13, 2022, pp. 1-27.
Rombach et al., "High-Resolution Image Synthesis with Latent Diffusion Models", In Proceedings of the Institute of Electrical and Electronics Engineers/CVF Conference on Computer Vision and Pattern Recognition, Apr. 13, 2022, pp. 1-45.
Ronneberger et al., "U-Net: Convolutional Networks for Biomedical Image Segmentation", Available online at: https://arxiv.org/pdf/1505.04597, May 18, 2015, pp. 1-8.
Russakovsky et al., "ImageNet Large Scale Visual Recognition Challenge", International Journal of Computer Vision, vol. 115, No. 3, Jan. 30, 2015, pp. 1-43.
Saharia et al., "Image Super-Resolution via Iterative Refinement", Institute of Electrical and Electronics Engineers Transactions on Pattern Analysis and Machine Intelligence, vol. 45, No. 4, Apr. 2023, pp. 4713-4726.
Saharia et al., "Palette: Image-to-Image Diffusion Models", Association for Computing Machinery SIGGRAPH 2022 Conference Proceedings, Aug. 7-11, 2022, pp. 1-10.
Saharia et al., "Photorealistic Text-to-Image Diffusion Models with Deep Language Understanding", Available online at: https://arxiv.org/pdf/2205.11487, May 23, 2022, pp. 1-46.
Sauer et al., "Adversarial Diffusion Distillation", Available online at: https://arxiv.org/pdf/2311.17042, Nov. 28, 2023, pp. 1-16.
Sauer et al., "Projected GANs Converge Faster", Advances in Neural Information Processing Systems, Available online at: https://arxiv.org/pdf/2311.17042, vol. 34, Dec. 6, 2021, pp. 1-13.
Sheynin et al., "Emu Edit: Precise Image Editing via Recognition and Generation Tasks", Available online at: https://arxiv.org/pdf/2311.10089, Nov. 16, 2023, pp. 1-23.
Singer et al., "Make-A-Video: Text-to-Video Generation Without Text-Video Data", Available online at: https://arxiv.org/pdf/2209.14792, Sep. 29, 2022, pp. 1-13.
Sohl-Dickstein et al., "Deep Unsupervised Learning using Nonequilibrium Thermodynamics", In International Conference on Machine Learning, Available online at: https://arxiv.org/pdf/1503.03585.pdf, vol. 37, Nov. 18, 2015, 18 pages.
Somepalli et al., "Diffusion Art or Digital Forgery? Investigating Data Replication in Diffusion Models", In Proceedings of the Institute of Electrical and Electronics Engineers/CVF Conference on Computer Vision and Pattern Recognition, 2023, pp. 6048-6058.
Somepalli et al., "Understanding and Mitigating Copying in Diffusion Models", 37th Conference on Neural Information Processing Systems, vol. 36, Dec. 15, 2023, pp. 1-21.
Song et al., "Denoising Diffusion Implicit Models", International Conference on Learning Representations 2021, Available online at: https://arxiv.org/pdf/2010.02502, Oct. 5, 2022, pp. 1-22.
Song et al., "Generative Modeling by Estimating Gradients of the Data Distribution", Advances in Neural Information Processing Systems, Oct. 10, 2020, pp. 1-23.
Song et al., "Score-Based Generative Modeling through Stochastic Differential Equations", Available online at: https://arxiv.org/pdf/2011.13456, Feb. 10, 2021, pp. 1-36.
Tong et al., "Improving and Generalizing Flow-based Generative Models with Minibatch Optimal Transport", Transactions on Machine Learning Research, Available online at: https://arxiv.org/pdf/2302.00482, Mar. 11, 2024, pp. 1-34.
Vaswani et al., "Attention is All You Need", Available online at: https://arxiv.org/pdf/1706.03762.pdf, Aug. 2, 2023, pp. 1-15.
Villani , "Optimal Transport, Old and New", Available online at: https://www.cedricvillani.org/sites/dev/files/old_images/2012/08/preprint-1.pdf, Jun. 13, 2008, 998 pages.
Vincent , "A Connection Between Score Matching and Denoising Autoencoders", Neural Computation, vol. 23, Dec. 2010, pp. 1-13.
Wallace et al., "Diffusion Model Alignment using Direct Preference Optimization", In Proceedings of the Institute of Electrical and Electronics Engineers/CVF Conference on Computer Vision and Pattern Recognition, Nov. 21, 2023, pp. 1-25.
Wang et al., "BFLOAT16: The Secret to High Performance on Cloud TPUs", Available Online at: https://cloud.google.com/blog/products/ai-machine-learning/bfloat16-the-secret-to-high-performance-on-cloud-tpus?hl=en., Aug. 24, 2019, 13 pages.
Wang et al., "CogVLM: Visual Expert for Pretrained Language Models", Available Online at: https://arxiv.org/pdf/2311.03079, Feb. 4, 2024, pp. 1-17.
Wortsman et al., "Small-Scale Proxies for Large-Scale Transformer Training Instabilities", Available online at: https://arxiv.org/pdf/2309.14322, Oct. 16, 2023, pp. 1-26.
Yu et al., "Scaling Autoregressive Models for Content-Rich Text-to-Image Generation", Transactions on Machine Learning Research, vol. 2, No. 3, Jun. 22, 2022, pp. 1-49.
Zhai et al., "Scaling Vision Transformers", In Proceedings of the Institute of Electrical and Electronics Engineers/CVF Conference on Computer Vision and Pattern Recognition, Jun. 20, 2022, pp. 12104-12113.
Zhang et al., "Root Mean Square Layer Normalization", 33rd Conference on Neural Information Processing Systems, vol. 32, Oct. 16, 2019, pp. 1-12.

\* cited by examiner

CONTENT SYNTHESIS USING GENERATIVE ARTIFICIAL INTELLIGENCE MODEL

CROSS-REFERENCES TO RELATED APPLICATIONS

This application is a non-provisional application which claims priority to U.S. Provisional Application No. 63/567,127 filed on Mar. 19, 2024, and U.S. Provisional Application No. 63/633,020, filed on Apr. 11, 2024, the contents of which are herein incorporated by reference in their entirety.

BACKGROUND

Artificial Intelligence (AI) models (e.g., machine learning (ML) models) can be used to generate output based on received natural language input prompts. Some AI models can be used to generate and output content (e.g., images) based on natural language input prompts. For example, a machine learning model may receive a prompt of a user, where the prompt asks the model to "generate an image of a cat napping on a blanket." In response, the machine learning model may generate an image that depicts a cat napping on a blanket.

BRIEF DESCRIPTION OF THE DRAWINGS

Various embodiments in accordance with the present disclosure will be described with reference to the drawings, in which.

DETAILED DESCRIPTION

Figure 1:
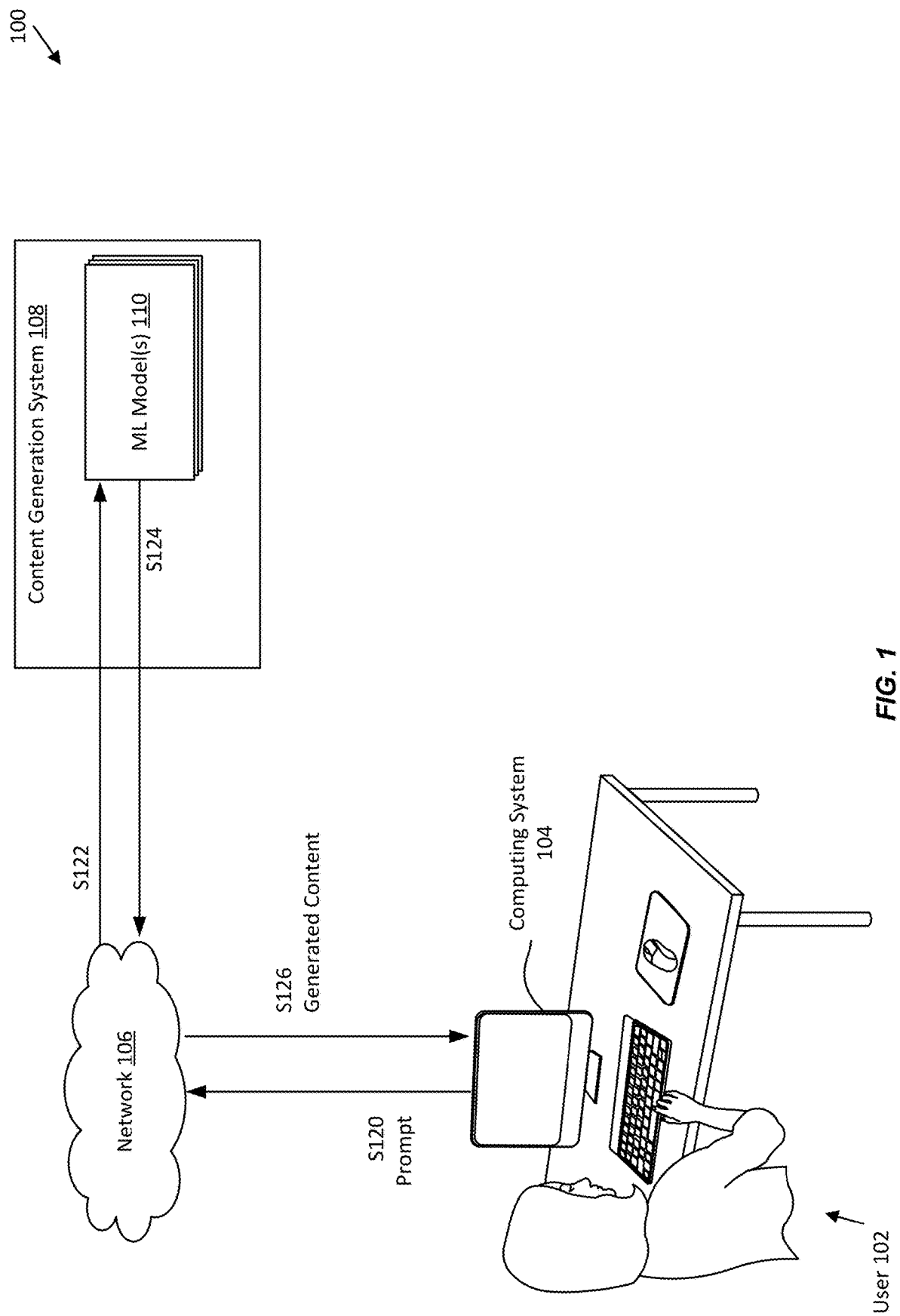
FIG. 1 illustrates an example of using a content generation system, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Challenges exist and relate to machine learning (ML) models generating content in response to prompts. Improvements can be made as to what can be generated with a machine learning model (e.g., images), how training of the machine learning model occurs, and how input can affect generated content output from the machine learning model. For example, improvements may enable generation of content in a scalable manner, efficiently, with high-quality, and accurately.

Use of transformer models in content (e.g., image) generative models has been limited. This tendency is reflected in a general conventional preference for a fully convolutional neural network architecture (e.g., U-Net) in diffusion models. Fully convolutional neural network's inductive bias does not necessarily make it the best choice for diffusion models. Disclosed transformer models can be used instead of a fully convolutional neural network architecture in content generation (e.g., text-to-image generation).

Embodiments of the present disclosure relate to techniques for generating content given a prompt. The prompt may include text, a video, audio, and/or an image. The generated content may include an image, a video, an image with a specific style, an image with a specific resolution, and/or an image with a specific aspect ratio, and/or content with one or more other characteristics. Latent diffusion models can be used to generate content with high resolution synthesis. Embodiments can provide improvements over conventional systems by enabling content to be generated at scale, efficiently (e.g., efficient use of resources (e.g., processing resources, memory resources, network resources), and at a high quality, making embodiments useful for generative modeling.

Embodiments herein can construct a sequence comprising encodings of two modalities (e.g., text input and image input). The sequence can include positional encodings and flattened patches of a latent pixel representation. After encoding and concatenating the patch encoding and text encoding to a common dimensionality, discloses reverse diffusion transformers can apply a sequence of modulated attention and Multi-Layer Perceptrons (MLPs) to generate content based on the text input (e.g., a prompt). Given the conceptual differences between two different modalities (e.g., text and image encodings), embodiments can employ separate sets of weights for each modality. While using an independent transformer for each modality, embodiment can combine the sequences of each modality for an attention operation (e.g., joint self attention), enabling both representations to work in their respective spaces while considering each other.

The disclosed latent diffusion models that use separate weights for each modality (e.g., text modality and image modality) and/or are configured for a bi-directional flow of information may be referred to as a multimodal latent diffusion model (MMDiT). The MMDiT can improve text understanding and spelling capabilities compared to traditional techniques. For example, embodiments can more accurately render text within generated images, ensuring textual elements such as fonts, styles, and sizes are represented properly. Additionally, the MMDiT architecture enables for efficient and effective generation of high-quality images conditioned on textual input.

Embodiments may include a Rectified Flow (RF) formulation, connecting data and noise on a linear trajectory during training. Including RF can result in straighter inference paths, enabling sampling with fewer steps and therefore in less time and using less resources (e.g., processing resources, network resources). Rectified flow may be used to train a diffusion model.

Embodiments may improve memory usage by removing one or more memory-intensive encoder models from being used at inference time that were used during training. Removing one or more encoder models can significantly reduce memory requirements and can do so with minimal performance loss.

Embodiments may effectively handle multi-subject prompts that include detailed descriptions of scenes, compositions, and/or scenarios involving more than one object, person, or concept. Multi-subject prompts provide rich and complex information for embodiments to generate corresponding content (e.g., images) that accurately represent the described scene or scenario. Handling multi-subject prompts effectively requires embodiments (e.g., the MMDiT) to understand and interpret the relationships between different subjects mentioned in the prompt to generate coherent and realistic images. By effectively handling prompts, creation of desired content with minimal deviation from the intended concept or scene is increased and thereby capable of reducing resources consumed in the generation compared to previous techniques. For example, if content generation is correct after a first prompt instead of after two prompts, less network, memory, processing, and/or energy resources may be utilized.

FIG. 1 illustrates an example of using a content generation system 108, according to embodiments of the present disclosure. The content generation system 108 may be used as part of a content creation system 100. The content creation system 100 may include a computing system 104, a network 106, and the content generation system 108. The content generation system 108 may receive a prompt (e.g., a natural language prompt) from the computing system 104 that causes content to be generated using one or more machine learning (ML) models 110. The generated content may be transmitted to the computing system 104 and presented by a user interface.

The computing system 104 may be a user device (e.g., laptops, personal computers, phones, etc.). The computing system 104 may be a server. The computing system 104 may be capable of receiving input from a user 102 via, for example, a user interface. In certain embodiments, the input received by the computing system 104 includes the prompt. The input may cause the computing system 104 to transmit the prompt to the content generation system 108 (e.g., via the network 106). As an example, a user interface of the computing system 104 may receive a natural language prompt (e.g., from user 102) that describes desired characteristics of content to be included in generated content, and the natural language prompt may be transmitted to the content generation system 108 via the network 106.

The prompt may include text (e.g., natural language text) that describes desired characteristics of content to generate such as one or more images and/or one or more videos. The characteristics may describe a style, a color, a subject, a mood, a texture, a contrast, a depth, a movement, a saturation, a focus, a perspective, a narrative, and/or another characteristic to be included in generated content. The prompt may include at least one of a text, an audio, an image, and/or a video. In some embodiments, text may describe a scene (e.g., a scene from a book or a script) that can then be used to generate content that corresponds to the text. In some embodiments, audio, image(s), and/or a video(s) can be included in the prompt to cause the content generation system 108 to generate content corresponding to the audio, image(s), and/or video(s). For example, a portion of an image may be included in the prompt and content may be generated that includes the portion or similar characteristics as the portion. In another example, a video scene from a movie may be included in the prompt and content may be generated by the content generated system 108 that includes similar characteristics (e.g., similar style, colors, subjects, mood, texture, contrast, depth, movement, saturation, focus, perspective, narrative, etc.) as the portion.

The prompt or other information from computing system 104 may include information to determine one or more encoders to use. In an example, encoders used to encode the prompt can be predetermined and constant during runtime. In an example, the prompt may explicitly state which encoders to use or set of encoders to use. In yet another example, the information included in the prompt may be used by content generation system 108 to determine one or more encoders and/or one or more set of encoders to use to encode the prompt or a portion of the prompt.

The prompt may be used as input to the content generation system 108 to cause content to be generated. The content generation system 108 may use a set of one or more machine learning models 110 to generate the content using the prompt. The set of one or more machine learning models 110 may include one or more encoder models, a decoder model, and/or a latent diffusion model (e.g., a diffusion transformer model). Training and using such models are described in further detail herein.

The generated content may include characteristics defined by the prompt. The content may include an image or a video. The generated content may have one or more predefined characteristics. For example, the content may have a predefined size (e.g., pixel dimensions, pixel count, bit size), a predefined max size. The content generation system 108 may transmit the generated content to the computing system 104 for presentation (e.g., for display, for presenting as a downloadable file).

By using the computing system 104 to present the content to the user 102, the user 102 may view the content. Computing system 104 may store the content in memory, send the content to another computing system (e.g., social media application, a different user device, etc.). In some embodiments, subsequent prompts may be received (e.g., from computing system 104 or another computing system) by the content generation system 108 to cause the content generation system 108 to alter the generated content.

The network 106 may be configured to connect the computing system 104 and the content generation system 108, as illustrated. The network 106 may be configured to connect any combination of the system components. In certain embodiments, the network 106 is not part of the content creation system 100. For example, the content generation system 108 may run locally on the computing system 104 and/or one or more of the set of ML models 110 may run locally on computing system 104.

Each of the network 106 data connections can be implemented over a public (e.g., the internet) or private network (e.g., an intranet), whereby an access point, a router, and/or another network node can communicatively couple the computing system 104 and the content generation system 108. A data connection between the components can be a wired data connection (e.g., a universal serial bus (USB) connector), or a wireless connection (e.g., a radio-frequency-based connection). Data connections may also be made through the use of a mesh network. A data connection may also provide a power connection. A power connection can supply power to the connected component. The data connection can provide for data moving to and from system components. One having ordinary skill in the art would recognize that devices may be communicatively coupled through the use of a network (e.g., a local area network (LAN), wide area network (WAN), etc.). Further devices may be communicatively coupled through a combination of wired and wireless means (e.g., wireless connection to a router that is connected via an ethernet cable to a server).

The interfaces between components communicatively coupled with the content creation system 100, as well as interfaces between the components within the content creation system 100, can be implemented using web interfaces and/or application programming interfaces (APIs). For example, the computing system 104 can implement a set of APIs for communications with the content generation system 108, and/or user interfaces of the computing system 104. In an example, the computing system 104 uses a web browser during communications with the content generation system 108.

The content creation system 100 illustrated in FIG. 1 may further implement the illustrated steps S120-S126. The illustrated steps may be implemented by executing instructions stored in a memory of the content creation system 100, where the execution is performed by processors of the content creation system 100.

At step S120, a prompt may be transmitted from the computing system 104 to the network 106. The prompt may include information received from a user interface of the computer system 104. For example, user 102 may have typed: "Please create an image of an old rusted robot wearing pants and a jacket riding skis in a supermarket" and the prompt may reflect the entered information and be transmitted to the network 106.

At step S122, the prompt may continue to be transmitted to the content generation system 108 from the computing system 104 via the network 106. After the content generation system 108 receives the prompt, the content generation system 108 may use the one or more machine learning models 110 to generate the content using the prompt.

At step S124, the content generation system 108 may transmit the generated content to the network 106.

At step S126, the network 106 may transmit the generated content to the computing system 104. Upon the computing system 104 receiving the generated content, the computing system 104 may present the generated content or portions thereof using the user interface of computing system 104. For example, computing system 104 may present an image or video on a display which is viewable by user 102.

Figure 2:
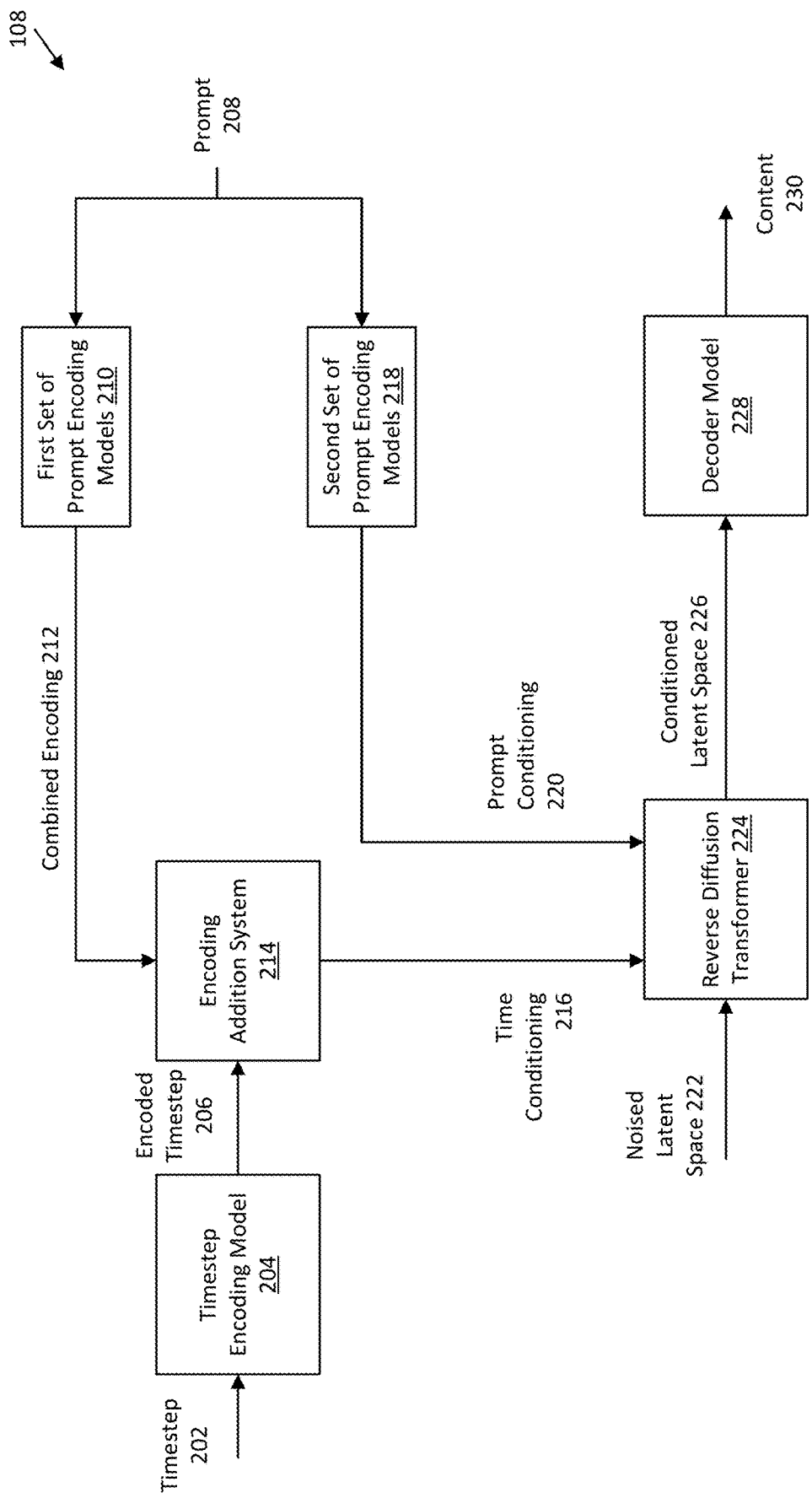
FIG. 2 illustrates an example of a content generation system, according to embodiments of the present disclosure.

FIG. 2 illustrates an example of a content generation system 108, according to embodiments of the present disclosure. The content generation system 108 may be the content generation system 108 described with respect to FIG. 1. The content generation system 108 may be configured to receive a prompt 208 and output generated content 230. The content generation system 108 may include one or more encoding models, an encoding addition system 214, a reverse diffusion transformer 224, and a decoder model 228. The one or more encoding models may include one or more prompt encoding models and a timestep encoding model 204.

The prompt 208 may be transmitted from a computing system (e.g., computing system 104, described above). Prompt 208 may be received from a system (e.g., via a network). Prompt 208 may be received by a user interface of the system. Prompt 208 may describe the desired characteristic of content to be generated by the content generation system 108. For example, a size (e.g., pixel dimensions, pixel count, bit size), a style, a color, a subject, a mood, a texture, a contrast, a depth, a movement, a saturation, a focus, a perspective, a narrative. Prompt 208 may be received by one or more prompt encoding models of the one or more prompt encoding models.

A prompt encoding model in the set of prompt encoding models may be configured to represent prompt 208 or a portion of prompt 208 in a multi-dimensional space (e.g., a vector space). The prompt encoding model may include neural network layers to convert prompt 208 or a portion of prompt 208 into a prompt encoding (e.g., first prompt encoding(s) 212, prompt conditioning 220) in the high dimensional space. The neural network layers used to generate the prompt encoding may be referred to as embedding layers. The prompt encoding model may be configured and/or previously trained to generate encodings for prompts that are represented as text, audio, an image, and/or video. The prompt encoding model may be a joint image and text encoding model (e.g., a Contrastive Language-Image Pre-Training (CLIP) model), a text encoder from a CLIP model, a large language model, a T5 model, a convolutional neural network transformer, or a recurrent neural network. One of ordinary skill in the art with the benefit of the present disclosure would recognize other ML models that may be used for prompt encoding.

The prompt encoding models may include a first set of prompt encoding models 210 and/or a second set of prompt encoding models 218. A set of prompt encoding models may include one or more prompt encoding models. The prompt encoding models may include one or more frozen prompt encoding models (e.g., trainable model attributes are preserved). The set of prompt encoding models used to encode prompt 208 or a portion of prompt 208 may be determined based on prompt 208. For example, the set of prompt encoding models used to encode prompt 208 or a portion of prompt 208 may be determined based on instructions in prompt 208 (e.g., to use a specific set of prompt encoding models). In an example, the set of prompt encoding models used to encode prompt 208 or a portion of prompt 208 may be determined based on information included in prompt 208 (e.g., prompt includes text, prompt includes text and image, prompt includes audio, etc.). The set of prompt encoding models used to encode prompt 208 or a portion of prompt 208 may be predefined (e.g., by a system administrator). The set of prompt encoding models used to encode prompt 208 or a portion of prompt 208 may be determined based on instructions received from a computing system.

In some embodiments, prompt 208 or a portion of prompt 208 is received by the first set of prompt encoding models 210 and/or the second set of prompt encoding models 218. The first set of prompt encoding models 210 may include one or more prompt encoding models to generate an encoding of at least a portion of prompt 208. The encodings generated by the first set of prompt encoding models 210 may be combined (e.g., via concatenation) into a single vector space represented by combined encoding 212. The first set of prompt encoding models 210 and the second set of prompt encoding models 218 may include one or more of the same prompt encoding models (e.g., a common CLIP model). The first set of prompt encoding models 210 and the second set of prompt encoding models 218 may include a different number of prompt encoding models. The second set of prompt encoding models 218 may include one or more prompt encoding models to generate an encoding of at least a portion of prompt 208. The generated encodings from the second set of prompt encoding models 218 may be combined (e.g., via concatenation) into a single vector space represented by prompt conditioning 220. The prompt conditioning 220 vector space may have a dimensionality that is the same as a dimensionality of a noised latent space 222 input to reverse diffusion transformer 224.

Timestep encoding model 204 can be used to encode timestep 202 as encoded timestep 206. A timestep 202 may be received by timestep encoding model 204. Timestep 202 may represent a timestep of the reverse diffusion process. Timestep encoding model 204 may encode timestep 202 using a neural network and/or encode timestep 202 based on a function. For example, timestep encoding model 204 may use a sinusoidal function to determine encoded timestep 206 based on the timestep 202. The output of the sinusoidal function may be represented in a vector space as encoded timestep 206. The vector space of encoded timestep 206 may have the same dimensionality as combined encodings 212.

Encoding addition system 214 may add the encoded timestep 206 vector with the combined encodings 212 vector to generate time conditioning 216. Time conditioning 216 may be used by a modulation attention mechanism of reverse diffusion transformer 224 and can enable conditional generation. Time conditioning 216 may be given a higher weight when the timestep 202 used to generate the time conditioning 216 is closer to the middle of a time window compared to other timesteps further away from the middle (e.g., is an intermediate time step).

Reverse diffusion transformer 224 may receive time conditioning 216, prompt conditioning 220, and noised latent space 222 as input. Reverse diffusion transformer 224 may use the inputs to generate a conditioned latent space 226. Noised latent space 222 may be a latent space that includes randomly generated noise. Noised latent space 222 may be generated based on sampling values according to a distribution (e.g., a gaussian distribution). Noised latent space 222 may be generated based on a seed. The seed may be input to the content generation system 108 (e.g., via a user interface). Noised latent space 222 may be stored in memory and used by reverse diffusion transformer 224.

Noised latent space 222 may include positional information. In some embodiments, noised latent space 222 is generated by adding a positional embedding to an initial noised latent space. The initial noised latent space may have been generated using techniques described above with respect to noised latent space 222. The initial noised latent space may represent a pixel encoding. The positional embedding can add information about the position of elements in the noised latent space 222. The positional embedding can help the reverse diffusion transformer understand relative positions and relationships between different parts of an image.

Reverse diffusion transformer 224 may be a machine learning model trained to generate a conditioned latent space (e.g., conditioned latent space 226) using a noisy latent space (e.g., noised latent space 222). Techniques for training reverse diffusion transformer 224 are described in further detail herein. The conditioned latent space 226 may be generated using a combination of prompt conditioning 220, time conditioning 216, and noised latent space 222.

Reverse diffusion transformer 224 may generate conditioned latent space 226 by removing noise from noised latent space 222. Reverse diffusion transformer 224 may iteratively remove noise from noised latent space 222 over timesteps (e.g., timestep 202) to obtain the conditioned latent space 226. Reverse diffusion transformer 224 may use one or more transformer blocks, described in further detail below, to generate conditioned latent space 226. Conditioned latent space 226 can be considered to be an encoded form of content (e.g., the generated content 230). Conditioned latent space 226 may be stored in memory of content generation system 108.

Decoder model 228 may receive conditioned latent space 226 as input and use conditioned latent space 226 to generate the content 230. Decoder model 228 may be trained using techniques described further herein. Decoder model 228 may be configured to receive conditioned latent space 226 after conditioned latent space 226 is output from reverse diffusion transformer 224. Decoder model 228 may include neural network layers that are used to generate content from an encoding of content (e.g., conditioned latent space 226). Decoder model 228 may include a recurrent neural network, a long short term memory network, a transformer model, a convolutional neural network, or another model architecture. One of ordinary skill in the art with the benefit of the present disclosure would recognize other architectures that may be used for decoder model 228.

Figure 3:
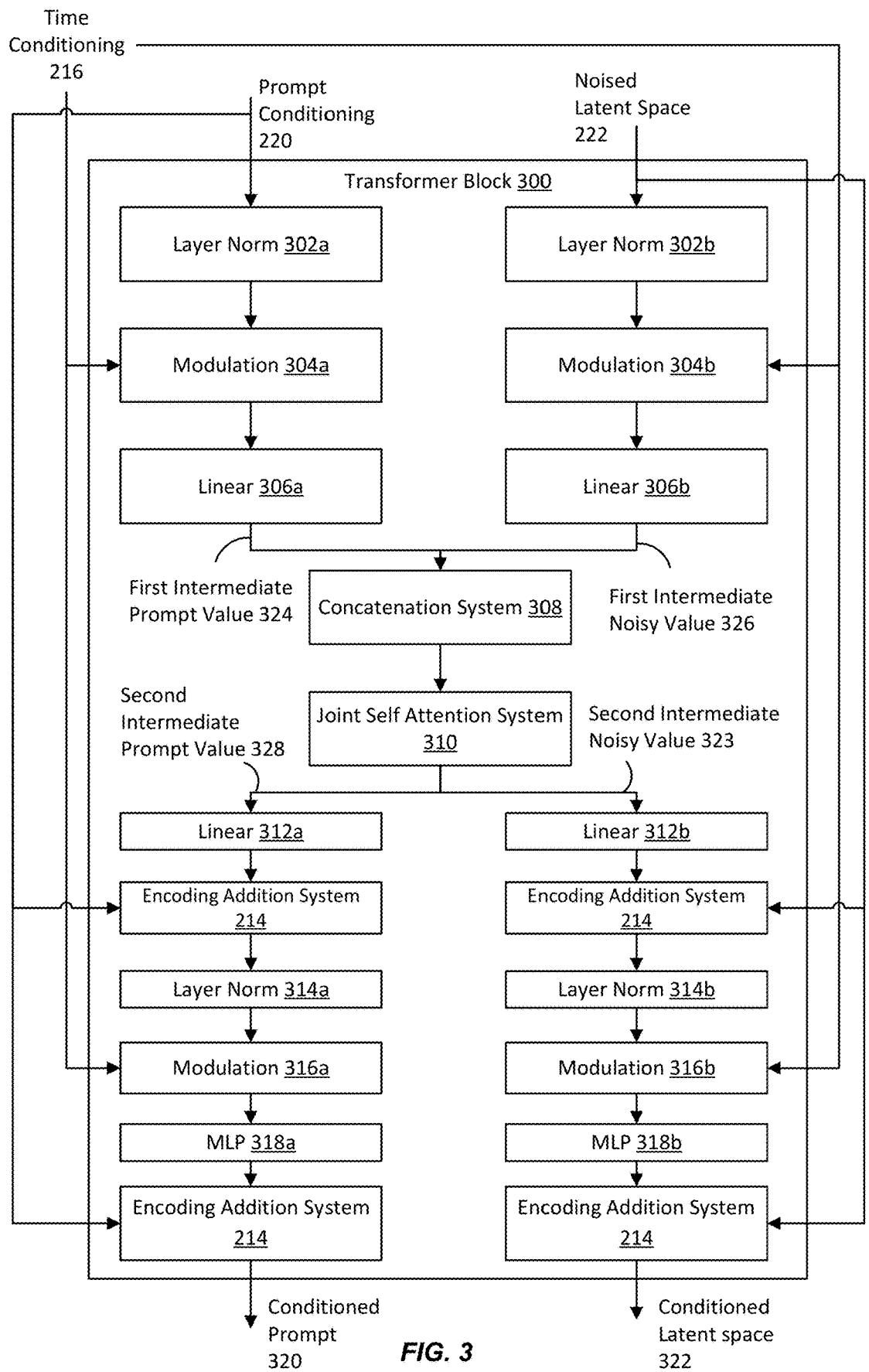
FIG. 3 illustrates an example of a transformer block of a diffusion transformer model, according to embodiments of the present disclosure.

FIG. 3 illustrates an example of a transformer block 300 of a diffusion transformer model (e.g., reverse diffusion transformer 224), according to embodiments of the present disclosure. Transformer block 300 may be one of multiple (e.g., 15, 38, many) transformer blocks included in the diffusion transformer model. Transformer block 300 may receive input from and/or transmit output to other transformer blocks.

Transformer block 300 may receive prompt conditioning 220, noised latent space 222, and time conditioning 216 as input (e.g., prompt conditioning 220, noised latent space 222, and time conditioning 216 described above). Transformer block 300 may receive the inputs from a previous transformer block if transformer block 300 is not the first transformer block of the reverse diffusion transformer. Transformer block 300 may receive the inputs from an encoding addition system (e.g., encoding addition system 214), a second set of prompt encoding models (e.g., second set of prompt encoding models 218), and a noised latent space generation system. Transformer block 300 may generate a conditioned prompt 320 and/or a conditioned latent space 322 using the inputs. The conditioned latent space 322 may be conditioned latent space 226 described above. Transformer block 300 may transmit conditioned prompt 320 and conditioned latent space 322 to a subsequent transformer block. Transformer block 300 may transmit conditioned latent space 322 to a decoder model (e.g., decoder model 228).

Transformer block 300 may operate on the prompt conditioning 220 vector and the noised latent space 222 vector separately for a portion of the operations performed. A sequence of operations may be performed separately on the prompt conditioning 220 vector and the noised latent space 222 vector because the vectors may represent encodings that include many conceptual differences (e.g., an image encoding and a text encoding). For example, prompt conditioning 220 may be subjected to layer normalization (layer norm) 302a operations, modulation 304a, and/or linear 306a operations to generate a first intermediate prompt value 324.

Layer normalization 302a can be used to cause neurons in a common layer to have the same normalization term (e.g., same mean and same variance). Layer normalization 302a can enable smoother gradients, faster training, and greater accuracy by normalizing the distributions of intermediate layers. An adaptive layer normalization (adaLN) can be used to condition the diffusion network on text representations, enabling parameter-efficient adaptation.

The modulation mechanism can enable conditional generation. Modulation may use time conditioning 216. The modulation mechanism may use scale (e.g., adjusting a range of data) and shift (e.g., shifting a data distribution) operations. Scale and shift operations may make features of data more suitable for modeling.

Linear 306a operations may perform linear transformations on the input. Linear 306a operations can be used to clean up data, extract features from data, and/or prepare data for further operations. The linear 306a layer operations may result from training using learnable low-rank (LoRA) matrices.

Similarly to layer normalization 302a, modulation 304a, and linear 306a, layer normalization 302, modulation 304b, and/or linear 306b operations may be performed on noised latent space to generate a first intermediate noisy value 326. After operating on prompt conditioning 220 vector and the noised latent space 222 vector separately, the first intermediate prompt value 324 and first intermediate noisy value 326 generated by respective operations may be combined (e.g., concatenated). The combination may be performed by a concatenation system 308 configured to concatenate two vectors.

The combined vectors may be used by a joint self attention system 310 to generate an output. Joint self attention system 310 combines the sequences of the first intermediate prompt value 324 and the first intermediate noisy value 326 (e.g., of different modalities) for the attention operation, enabling both representations to work in their respective vector spaces while considering each other. Joint self attention system 310 may enable contextual relationships to be captured between the two intermediate embedding spaces. The output from joint self attention system 310 may be operated on using two separate sequences of operations. For example, each sequence of operations may include any combination of a linear transformation, layer normalization, modulation, encoding addition, and/or using a multi-layer perceptron (MLP). A MLP can be configured to perform multiple layers of nonlinear transformations on input. An exemplary first sequence of operations performed on the output from joint self attention system 310 is illustrated as linear operations 312a, encoding addition using encoding addition system 214, encoding addition using encoding addition system 214, layer normalization 314a, modulation 316a, MLP 318a, and encoding addition using encoding addition system 214. An exemplary second sequence of operations performed on the output from the joint self attention system 310 is illustrated as linear operations 312a, encoding addition using encoding addition system 214, layer normalization 314a, modulation 316a, MLP 318a, and encoding addition using encoding addition system 214.

After the output from joint self attention system 310 is operated on using the two separate sequences of operations, conditioned prompt 320 and conditioned latent space 322 generated by the respective sequence of operations can be output from block 300. The sequence of separate operations may be equivalent to having a transformer with independent weights for each modality but allows each of the two transformers to perform operations informed by the other.

As an example, conditioned prompt 320 may be generated from, a joint self attention system, a first sequence of operations (e.g., 302a, 304a, 306a, 308, 312a, 214, 314a, 316a, and/or 318a), and at least a first weight included in a first set of weights associated with a first domain (e.g., a text domain) of the conditioned prompt 320. Conditioned latent space 322 may be generated from, a joint self attention system, second sequence of operations (e.g., 302b, 304b, 306b, 308, 312b, 214, 314b, 316b, and/or 318b), and at least a second weight included in a second set of weights associated with a second domain (e.g., a content domain) of the conditioned latent space 322.

Figure 4A:
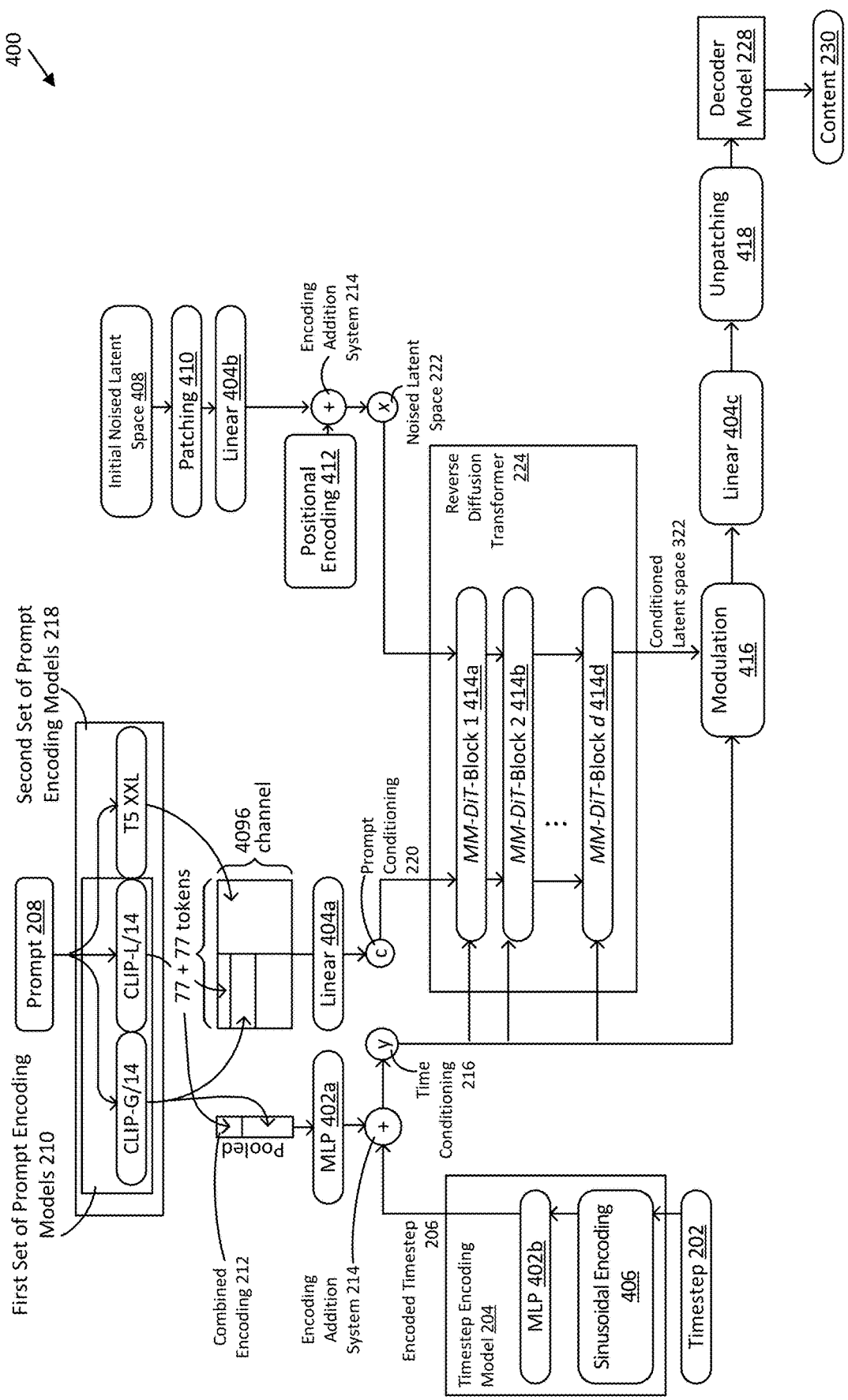
FIG. 4A illustrates an exemplary content generation system, according to embodiments of the present disclosure.
Figure 4B:
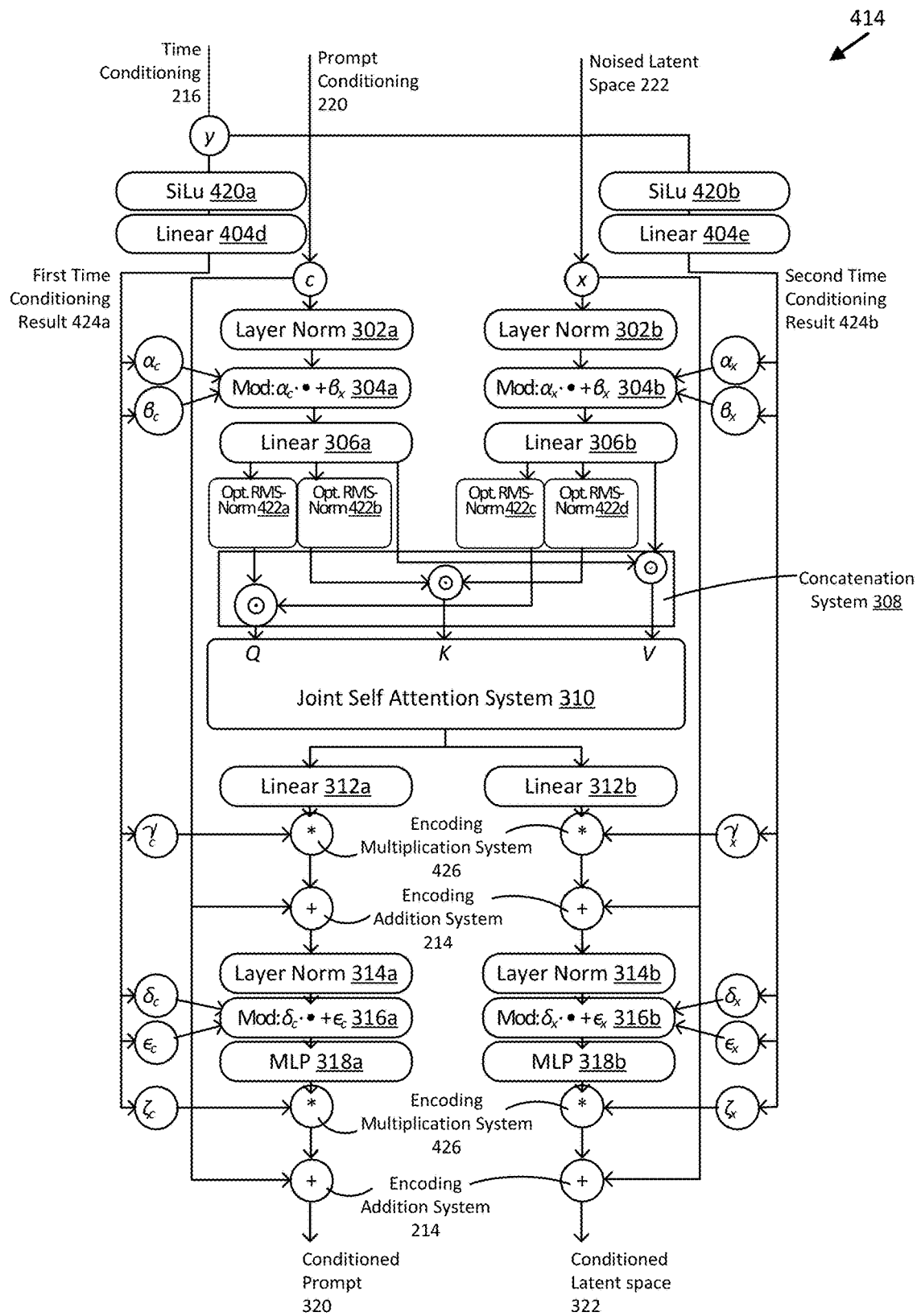
FIG. 4B illustrates an exemplary block included in a reverse diffusion transformer, according to embodiments of the present disclosure.

FIG. 4A illustrates an exemplary content generation system 400, according to embodiments of the present disclosure. FIG. 4B illustrates an exemplary transformer block 414 (e.g., 414a, 414b, through 414d) included in reverse diffusion transformer 224, according to embodiments of the present disclosure. Exemplary transformer block 414 is an example of transformer block 300. Like components may be indicated by like part numbers. For example, linear 404b operations may be similar operations to linear 404a operations.

Exemplary content generation system 400 may receive a prompt 208 (e.g., described above) and generate content 230 (e.g., described above) based on prompt 208. Exemplary content generation system 400 includes a first set of prompt encoding models 210, a second set of prompt encoding models 218, a timestep encoding model 204, a reverse diffusion transformer 224, and a decoder model 228, each of which have been described with respect to at least FIG. 2.

The first set of prompt encoding models 210 may generate one or more encodings of prompt 208. In the illustrated example, the first set of prompt encoding models 210 include a CLIP-G/14 encoding model and a CLIP-L/14 encoding model. In certain embodiments, more or less encoding models are used. In certain embodiments, a different combination of encoding models are used. The first set of prompt encoding models 210 may include one or more encoding models that were used during training of the exemplary content generation system 400. In the illustrated embodiments, each of the encoding models included in the first set of prompt encoding models 210 generates an encoding of at least a portion of prompt 208.

Exemplary content generation system 400 illustrates an embodiment where encoding output from the CLIP-G/14 encoding model and CLIP-L/14 encoding model may be pooled and of sizes, 768 and 1280 respectively. The pooled outputs may be concatenated to obtain a vector conditioning $c_{vec} \in \mathbb{R}^{2048}$. $c_{vec}$ is illustrated as combined encoding 212. Combined encoding 212 may include coarse-granted information about prompt 208.

The penultimate hidden representations from the CLIP-G/14 encoding model and CLIP-L/14 encoding model can be concatenated channel-wise to a CLIP context conditioning $c_{ctxt}^{CLIP} \in \mathbb{R}^{77 \times 2048}$. c can then be encoded to a final hidden representation $c_{ctxt}^{T5} \in \mathbb{R}^{77 \times 4096}$, of the encoder of a T5-v1.1-XXL model. $c_{ctxt}^{CLIP}$ can then be zero-padded along the channel axis to 4096 dimensions to match the T5 representation and be concatenated along the sequence axis with $c_{ctxt}^{T5}$ to obtain a final context representation, $c_{ctxt} \in \mathbb{R}^{154 \times 4096}$. $c_{ctxt}$ is illustrated as prompt conditioning 220.

The second set of prompt encoding models 218 may generate one or more encodings of prompt 208. In the illustrated example, the second set of prompt encoding models 218 include a CLIP-G/14 encoding model and a CLIP-L/14 encoding model, and a T5 XXL encoding model. In certain embodiments, more or less encoding models are used. In certain embodiments, a different combination of encoding models are used. The second set of prompt encoding models 218 may include one or more encoding models that were used during training of the exemplary content generation system 400. In the illustrated embodiments, each of the encoding models included in the second set of prompt encoding models 218 generates an encoding of at least a portion of prompt 208.

Exemplary content generation system 400 illustrates that prompt conditioning 220 may, in addition to the above described operations, undergo linear operations before being used by the reverse diffusion transformer 224. Linear operations have been described above with respect to linear 306a operations. Exemplary content generation system 400 illustrates that combined encoding 212 may be input to a MLP 402a. Operations of a MLP have been described above in further detail. The output of MLP 402a may be transmitted to an encoding addition system 214 to be added with an encoded timestep 206 output from the timestep encoding model 204 to generate time conditioning 216 (described in further detail above).

Encoded timestep 206 may be generated by timestep encoding model 204. Timestep encoding model 204 may generate encoded timestep 206 using a received timestep 202. Timestep encoding model 204 may perform sinusoidal encoding 406 and use a MLP 402b. MLP 402b may perform operations in a similar manner to above described MLPs. The sinusoidal encoding 406 may include using a sinusoidal function to determine an output encoding based on the timestep 202. The output of the sinusoidal encoding 406 may be represented in a vector space.

A noised latent space 222 may also be received and/or generated by exemplary content generation system 400 to use as input to reverse diffusion transformer 224. Noised latent space 222 may be a latent pixel representation. Noised latent space 222 may be generated by adding (e.g., using encoding addition system 214) a positional encoding 412 with an initial noised latent space 408 or a latent space derived using the initial noised latent space 408 (e.g., after patching 410 operations and/or linear 404b operations have been performed on the initial noised latent space 408). Patching 410 operations may flatten patches (e.g., 2×2 patches) of the noised latent pixel representation $x \in \mathbb{R}^{h \times w \times c}$ to a patch encoding sequence of length 0.5*h*0.5*w. The noised latent space 222 may have a common dimensionality as prompt conditioning 220.

Reverse diffusion transformer 224 may use the time conditioning 216, prompt conditioning 220, and the noised latent space 222 as inputs to generate content 230. Reverse diffusion transformer 224 may include any number of transformer blocks 414 (e.g., MM-DiT-Blocks 414a, 414b, through 414d). In an embodiment, reverse diffusion transformer's 224 size is parameterized in terms of the model's depth d (e.g., the number of attention blocks) by setting the hidden size to 64*d (expanded to 4*64*d channels in the MLP blocks), and the number of attention heads equal to d. Reverse diffusion transformer 224 and the transformer blocks 414 may use the time conditioning 216 and prompt conditioning 220 as inputs to modulation mechanism(s). The transformer blocks 414 are described in further herein (e.g., with respect to FIGS. 3 and 4B).

After a number of blocks included in reverse diffusion transformer 224 have received input and generated corresponding output, the last transformer block 414d may cause a conditioned latent space 322 to be output. The conditioned latent space 322 may be output from reverse diffusion transformer 224. Conditioned latent space 322 may undergo modulation 416 operations (e.g., modulation operations described above), leaner 404c operations, and/or unpatching 418 operations. Unpatching 418 operations upsample the conditioned latent space 322 into a dimensionality that the decoder model 228 (e.g., described above) can use to generate the content 230.

FIG. 4B illustrates an exemplary transformer block 414 (e.g., 414a, 414b, through 414d) included in reverse diffusion transformer 224, according to embodiments of the present disclosure. Exemplary transformer block 414 can receive time conditioning 216, prompt conditioning 220, and/or noised latent space 222 as input and use the inputs to generate a conditioned prompt 320 and/or a conditioned latent space 322. Conditioned prompt 320 and conditioned latent space 322 have been described in further detail above and may be used in subsequent transformer blocks (e.g., exemplary transformer block 414d) and/or output from the transformer model (e.g., reverse diffusion transformer 224). Conditioned latent space 322 may be decoded by a decoder model to generate content 230.

Exemplary transformer block 414 may perform swish activation function (SiLu) 420a operations and linear 404d operations on time conditioning 216 to generate a first time conditioning result 424a. The first time conditioning result 424a may be used to condition the vector space being operated on to generate the conditioned prompt 320. Similarly, separate operations (SiLu 420b and linear 404e) may be performed on time conditioning 216 to generate a second time conditioning result 424b. The first time conditioning result 424a and the second time conditioning result 424b may not be equal due to different weighting configured (e.g., based on training) to be used with the prompt modality (e.g., text, prompt conditioning 220) compared to the content modality (e.g., image, noised latent space 222). As illustrated, values from the first time conditioning result 424a and second time conditioning result 424b may be used during various steps of the operations performed by exemplary transformer block 414.

Prompt conditioning 220 may undergo other operations such as layer norm 302a operations, modulation 304a operations, linear 306a operations, and/or Root Mean Squared (RMS) normalization operations 422 before being used as input to a concatenation system 308. The concatenation system may use input values to generate values to transmit to the joint self attention system 310. Joint self attention system 310 may generate an output using inputs associated with the prompt conditioning 220 and noised latent space 222. The normalization operations 422 can prevent attention logit growth instability and enable efficient training. When the model uses the normalization operations 422 in addition to the layer norm 302a operations, the normalization operations 422 can help stabilize large models.

Output from joint self attention system 310 may be used to perform linear 312a operations, encoding multiple operations using an encoding multiplication system 426, encoding addition operations using encoding addition system 214, layer norm 314a operations, modulation 316a operations, MLP 318a operations, additional encoding multiple operations using an encoding multiplication system 426, and/or encoding addition operations using encoding addition system 214 to the conditioned prompt 320. The encoding multiplication system may use values generated using the time conditioning 216 and an intermediate value from the sequence of operations to generate output. The encoding addition system 214 may use the prompt conditioning 220 and an intermediate value from the sequence of operations to generate output.

Similar operations may be performed with the noised latent space 222 as was done with the prompt conditioning 220, but instead with the noised latent space 222 instead of the prompt conditioning 220. The similar operations may generate the conditioned latent space 322.

Figure 5:
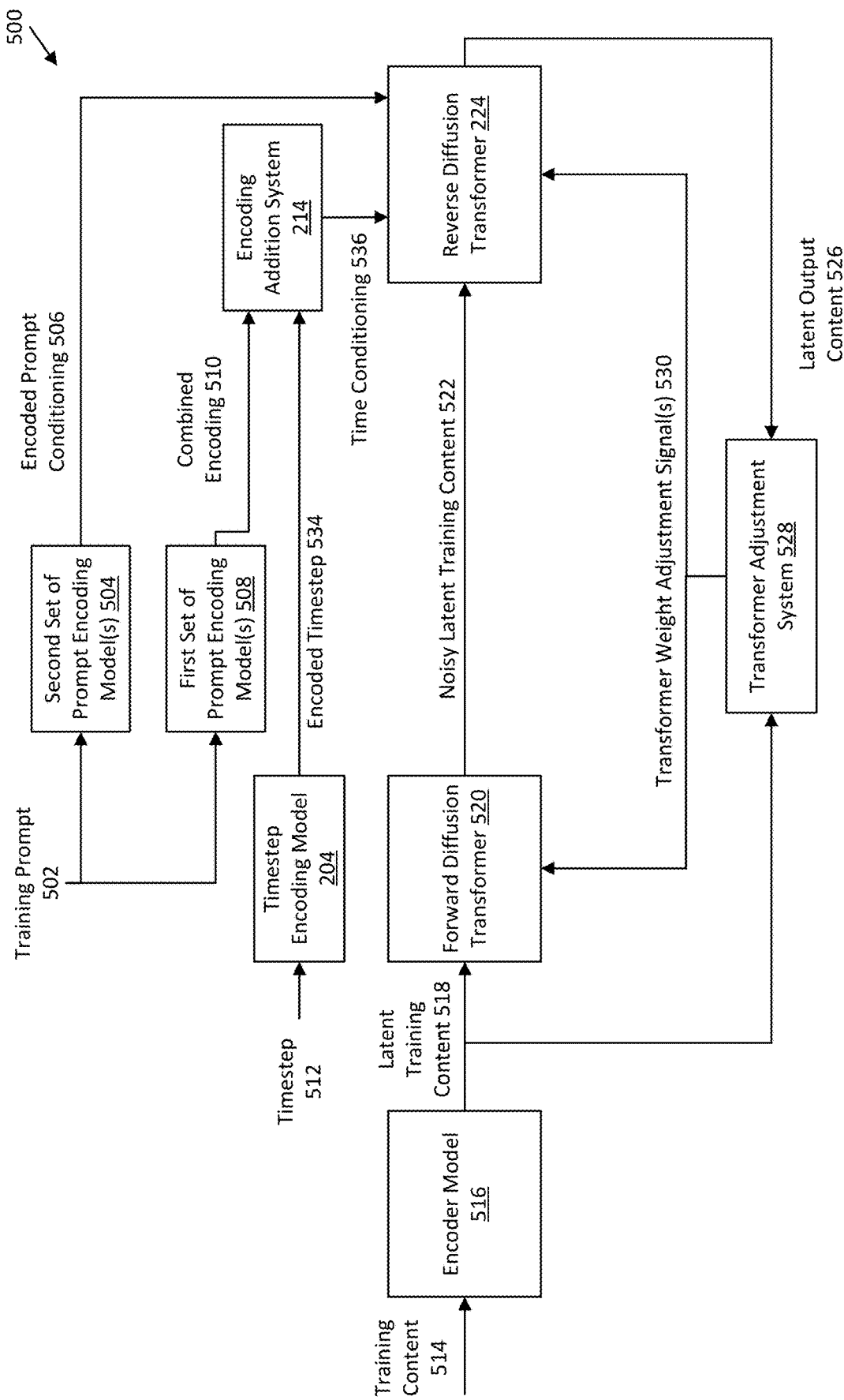
FIG. 5 illustrates an example of a system for training a diffusion transformer, according to embodiments of the present disclosure.

FIG. 5 illustrates an example of a system 500 for training a diffusion transformer, according to embodiments of the present disclosure. The diffusion transformer model may include a forward diffusion transformer 520 (e.g., a system or a model) and a reverse diffusion transformer 224 that may be configured by a transformer adjustment system 528 during a training process. Forward diffusion transformer 520 may include a system configured to carry out a process of adding noise a latent training content 518 (e.g., ground truth latent) to generate a noisy latent training content 522. On the other hand, reverse diffusion transformer 224 may be configured to generate latent output content 526 using an encoded prompt conditioning 506, time conditioning 536, and/or noisy latent training content 522. The reverse diffusion transformer may be the reverse diffusion transformer 224 described above.

In some embodiments, the architecture of the forward diffusion transformer 520 may be similar to the architecture described above with respect to the reverse diffusion transformer model in FIG. 2 but configured to generate a noisy latent training content 522 using latent training content 518

Before the reverse diffusion transformer 224 can be used during inference time, reverse diffusion transformer 224 may first be trained to reverse noise introduced by forward diffusion transformer 520. Forward diffusion transformer 520 may introduce noise into latent training content 518 to generate noisy latent training content 522 so that reverse diffusion transformer 224 can learn how to reverse the noise introduced by forward diffusion transformer 520. Forward diffusion transformer 520 uses latent training content 518 generated by encoding training content 514 with encoder model 516. Latent training content 518 may be considered as a ground truth for training purposes. Forward diffusion transformer 520 generates a progressively noisier noisy latent training content 522 and passes the generated noisy latent training content 522 to reverse diffusion transformer 224 to undo the added noise and attempt to obtain the latent training content 518 from the noisy latent training content 522. Forward diffusion transformer 520 may add noise to the latent training content 518 by sampling from a gaussian distribution to get a vector of the same size as latent training content 518, then interpolating between the latent training content 518 and the noise data based on coefficients derived from a sampled timestep value.

Training reverse diffusion transformer 224 and/or forward diffusion transformer 520 may be carried out using a set of training data including pairs of content (e.g., training content 514) and prompts (e.g., training prompt 502). For example, training data in the set of training data may include a training prompt 502 that states "photo of a bear wearing a suit and top hat in a river in the middle of a forest holding a sign that says 'I can't bear it,'" and a corresponding training content 514 that includes an image of a bear wearing a suit and top hat in a river in the middle of a forest holding a sign that says "I can't bear it." The training data may have been generated by performing a cluster-based deduplication method to remove perceptual and semantic duplicates from initial training data.

The training content 514 and training prompt 502 may each be used during the process of training reverse diffusion transformer 224. The training prompt 502 included in the training data may also be used during training of a prompt encoding model included in the first set of prompt encoding models 508 and/or the second set of prompt encoding models 504 (e.g., before a first set of prompt encoding models 508 and/or a second set of prompt encoding models 504 is used to perform inference time computations to generate the encoded prompt conditioning 506, the combined encoding 510, the combined encoding 212, and/or the prompt conditioning 220).

The training content 514 may be used with an encoder model 516 to generate latent training content 518. Forward diffusion transformer 520 may generate the noisy latent training content 522 using the latent training content 518. Noisy latent training content 522 may be received from encoder model 516. Encoder model 516 may have been trained to generate an output latent representation of input content the encoder model 516 receives. Latent training content 518 may be a high dimensional representation of the training content 514. Encoder model 516 may have been pretrained for content in general or may be trained for specific form of content (e.g., images, video, images of a specific style, images of a specific mood, image with specific colors, etc.).

At least a portion of training prompt 502 included in the training data may be input to the first set of prompt encoding models 508 and/or the second set of prompt encoding models 504. The first set of prompt encoding models 508 may be the first set of prompt encoding models 210 described above or another set of prompt encoding models. The second set of prompt encoding models 504 may be the second set of prompt encoding models 218 described above or another set of prompt encoding models. One or more of the prompt encoding models included in a set of prompt encoding models may have been trained to generate an encoding of a prompt (e.g., training prompt 502) or a portion of the prompt. Training prompt 502 may include text, audio, video, and/or an image, etc. The encoded prompt conditioning 506 generated by the second set of prompt encoding models 504 can be used by reverse diffusion transformer 224 to generate the latent output content 526. The combined encoding 510 generated by the first set of prompt encoding models 508 can be used by the encoding addition system 214 to generate a time conditioning 536 which can be used by reverse diffusion transformer 224 to generate the latent output content 526. Encoding addition system 214 may be the encoding addition system 214 described above and add the combined encoding 510 with an encoded timestep 534.

The encoded timestep may be generated by a timestep encoding model 204 (e.g., timestep encoding model 204 described with respect to FIGS. 2 and 4A) based on a timestep 512. Timesteps may be sampled in a non-uniform manner. In certain embodiments, timesteps are sampled with a higher frequency between a starting timestep and an ending timestep. For example, sampling timesteps may follow near a normal distribution or a logit—normal distribution. Timesteps and the timestep encoding model have been described in further detail herein. By sampling with a higher frequency in the middle steps compared to early and late steps where the inverse diffusion process is very hard or very easy, the generated output may be more accurate (e.g., more accurately reflect the prompt).

The noisy latent training content 522 generated by forward diffusion transformer 520 may also be used as input to reverse diffusion transformer 224 to train reverse diffusion transformer 224 to generate latent output content 526 based on noisy latent training content 522. Reverse diffusion transformer 224 may use the encoded prompt conditioning 506, the time conditioning 536, and the noisy latent training content 522 to learn to recognize how a training prompt 502 corresponds to the latent training content 518 that was used to generate the noisy latent training content 522. Reverse diffusion transformer 224 may use the encoded prompt conditioning 506 and the time conditioning 536 to perform conditioning (e.g., cross attention conditioning, self-attention conditioning). The learning/training may be performed over many iterations. Over the iterations, parameter values of reverse diffusion transformer 224 and/or forward diffusion transformer 520 (e.g., if a forward diffusion transformer model system is being used) may be adjusted using transformer weight adjustment signals 530 from the transformer adjustment system 528.

Transformer adjustment system 528 may compare the latent output content 526 generated by reverse diffusion transformer 224 and latent training content 518 (e.g., a ground truth) to determine transformer weight adjustment signals 530 to transmit to forward diffusion transformer 520 (e.g., in embodiments where forward diffusion transformer 520 is a model) and/or reverse diffusion transformer 224. Transformer adjustment system 528 may use a loss function to compare latent training content 518 and latent output content 526. Transformer adjustment system 528 may transmit the transformer weight adjustment signals 530 with the goal of minimizing the loss function. The loss is used to generate gradients to train the transformer(s) during back propagation.

In some embodiments, the reverse diffusion transformer 224 is using images of a first size and fine tuned using images with a second size greater than the first size and/or images with mixed aspect ratios.

In certain embodiments, training prompt 502 and training content 514 are obtained from a predefined set of training data. In certain embodiments, the predefined set of training data may be limited in size and/or the attributes of the training prompt 502 corresponding to the training content 514. At least a portion of the training data training content 514 may be used to synthetically generate training prompts 502. A vision-language model (e.g., CogVLM) may be used to generate synthetic training prompts 502. Training the reverse diffusion transformer 224 may include training that uses at least a portion of the generated/synthetic training prompts 502 and the corresponding training content 514. In certain embodiments, training data includes prompts from an original dataset and prompts generated synthetically using the above-described technique. The training data may include a split between original and synthetic prompts (e.g., a 50/50 split). Synthetically generated prompts may be used to improve image output generated by the reverse diffusion transformer 224. The synthetic captions may enable models that use text to generate images to be trained on more data and/or trained on data with varying characteristics. For example, prompts generated by humans may include different language and/or focus on different descriptions than a prompt generated by a vision-language model.

Figure 6:
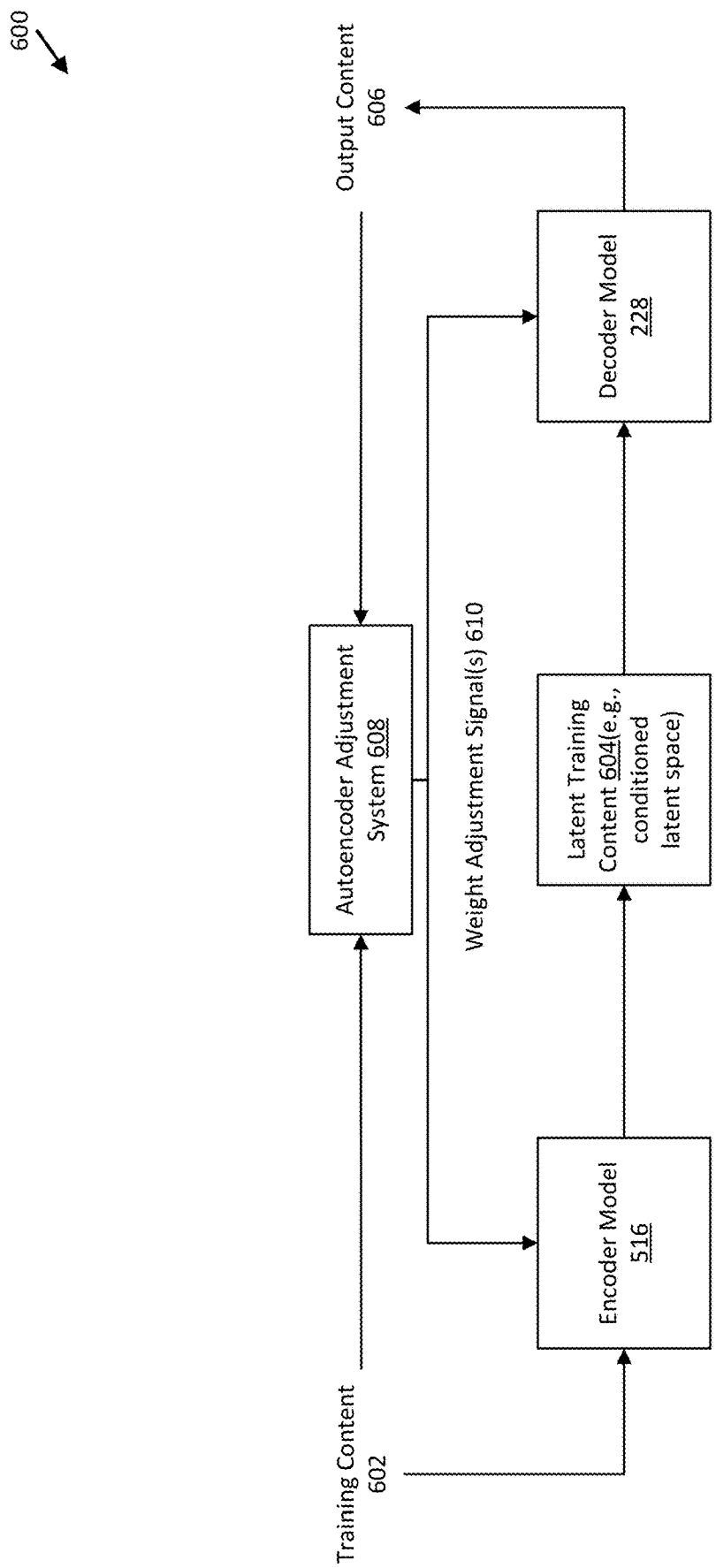
FIG. 6 illustrates an example of a system for training an encoder model and/or a decoder model, according to embodiments of the present disclosure.

FIG. 6 illustrates an example of a system 600 for training an encoder model (e.g., encoder model 516) and/or a decoder model (e.g., decoder model 228), according to embodiments of the present disclosure. System 600 may include an encoder model 516, the decoder model 228, and an autoencoder adjustment system 608. Decoder model 228 and/or encoder model 516 may be trained by using the autoencoder adjustment system 608 to compare ground truth training content 602 to output content 606 generated by decoder model 228 and adjusting weights of the encoder model 516 and/or the decoder model 228 based on the comparison. Through training iterations, the decoder model 228 can learn to generate accurate output content 606 using latent training content 604. Latent training content 604 may have the same dimensions as a conditioned latent space (e.g., conditioned latent space 226, latent output content 526) generated by reverse diffusion transformer models described with respect to FIGS. 1-5, above, so that the decoder model 228 can generate content 230 using the conditioned latent space 226 generated by reverse diffusion transformer 224.

Encoder model 516 may have been trained and/or be trained by system 600 to generate an embedding of the ground truth training content 602. Training content 602 may be an image, a video or other content. Training content 602 may include the training content (e.g., in a pixel space) used for training described above. Encoder model 516 may process training content 602 by a series of convolutional blocks, each of which performs downsampling. All convolutions may be parameterized in a weight-normalized form. Encoder model 516 may map an input into a lower dimensional space. Increasing a number of latent channels can improve reconstruction performance. The reconstruction quality of encoder model 516 may provide an upper bound on achievable image quality after latent diffusion training. As an example, the number of latent channels may be equal to 16 and achieve an improvement over an encoder model that uses 8 channels. The numbers of channels may also be balanced while considering that a lower number of channels may enable the model to use less resources. Diminishing returns can exist as the latent channels are increased.

Latent training content 604 generated by encoder model 516 may be transmitted to decoder model 228 to be used as input to decoder model 228. Decoder model 228 may be trained by system 600 to output generated output content 606 (e.g., in a pixel space) based on latent training content 604 (e.g., an encoding of the ground truth training content 602). Output content 606 may include an image, a video, or other content. The architecture of decoder model 228 may be similar to the architecture of encoder model 516, but employ upsampling blocks. Decoder model's 214 architecture is further described above with respect to FIG. 3.

The autoencoder adjustment system 608 can use output content 606 and training content 602 (a ground truth) to determine weight adjustment signals 610 to send to encoder model 516 and/or decoder model 228. Autoencoder adjustment system 608 may compare the output content 606 and training content 602 using a loss function. In some embodiments, a reconstruction loss function is used. Based on the comparison of output content 606 and training content 602 using the loss function, autoencoder adjustment system 608 may transmit the weight adjustment signals 610 to encoder model 516 and/or decoder model 228 with the goal of reducing the loss function. In some embodiments, an adversarial loss term is used by the autoencoder adjustment system 608, utilizing a convolutional discriminator model. The discriminator model may include hyperparameters.

Figure 7:
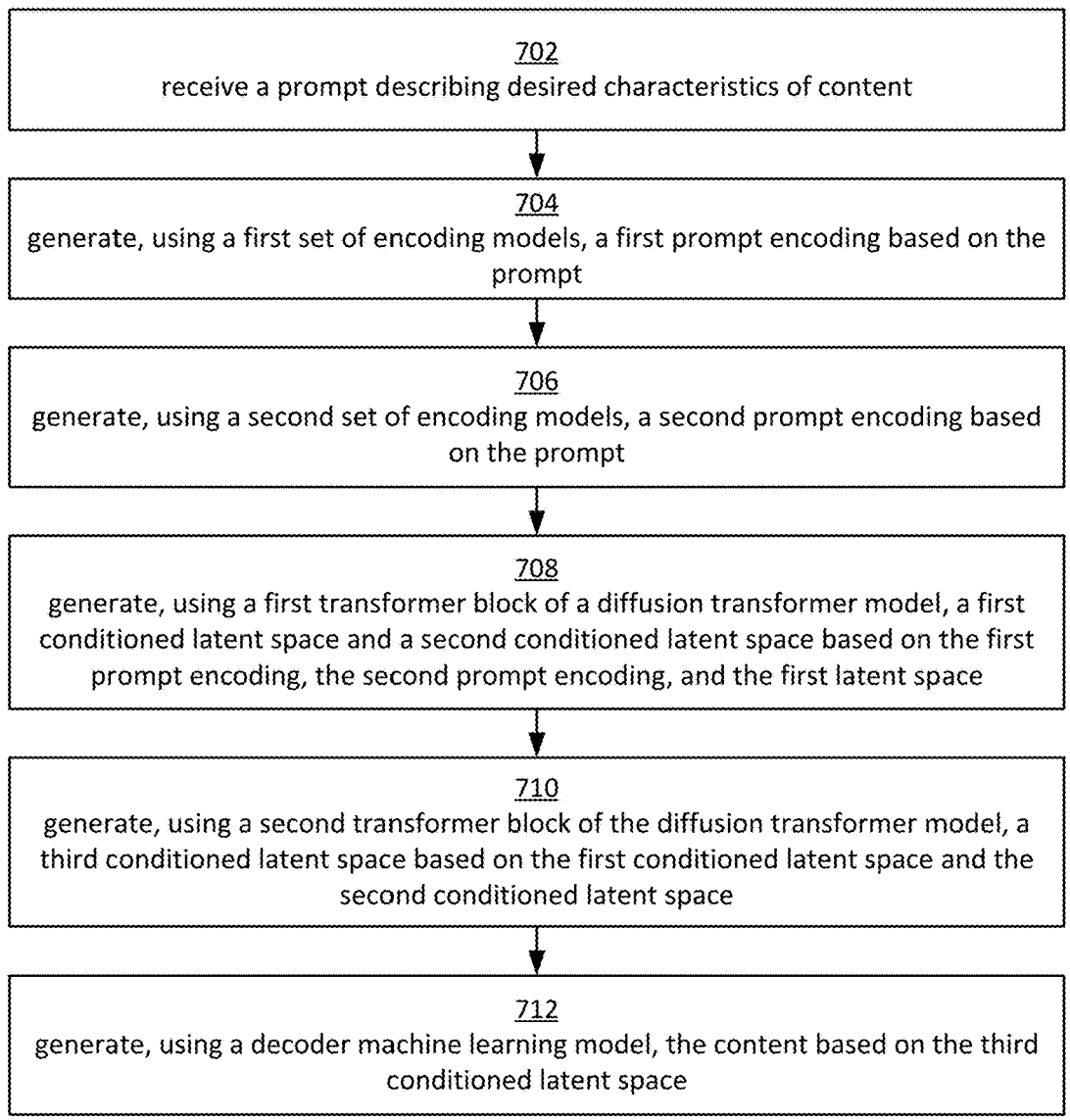
FIG. 7 illustrates an example of a process for using a content generation system, according to embodiments of the present disclosure.

FIG. 7 illustrates an example of a process 700 for using a content generation system (e.g., content generation system 108 described above), according to embodiments of the present disclosure.

At step 702, a prompt is received by the content generation system. The prompt may be received from a computing system (e.g., computing system 104). The prompt may describe one or more desired characteristics of content to be generated by the content generation system. For example, the desired characteristics may include a style, a color, a subject, a mood, a texture, a contrast, a depth, a movement, a saturation, a focus, a perspective, a narrative, and/or another characteristic. The prompt may include example content (e.g., images, video), audio, text, images, video. Content in a prompt may be used as inspiration for generating content. The prompt may include content to be added to and/or altered by the content generation system.

At step 704, a first prompt encoding (e.g., combined encoding 212) may be generated. The first prompt encoding may be generated by inputting the prompt to a first set of one or more encoding models. Encoding models included in the first set of one or more encoding models may each generate an encoding of at least a portion of the prompt and output the encoding of the portion, which can then be combined with other encodings from encoding models included in the first set of encoding models to generate the first prompt encoding. The first set of encoding models may include one or more text encoders. The first set of encoding models may be used on one or more portions of the prompt. As an example, the first set of encoding models may include a CLIP-G/14 model and a CLIP-L/14 model.

At step 706, a second prompt encoding (e.g., prompt conditioning 220) may be generated. The second prompt encoding may be generated by inputting the prompt to a second set of one or more encoding models. Encoding models included in the second set of one or more encoding models may each generate an encoding of at least a portion of the prompt and output the encoding of the portion, which can then be combined with other encodings from encoding models included in the second set of encoding models to generate the second prompt encoding. The second set of encoding models may include one or more text encoders. The second set of encoding models may be used on one or more portions of the prompt. As an example, the second set of encoding models may include a CLIP-G/14 model, a CLIP-L/14 model, and/or a T5 XXL model.

The first set of encoding models and the second set of encoding models may include one or more of the same encoding models (e.g., with the same parameters and architecture). The first set of encoding models and the second set of encoding models may include one or more encoding models that are not included in the second set of encoding models or the first set of encoding models, respectively. In some embodiments, the first set of encoding models and/or the second set of encoding models is trained using more encoding models than the respective set uses at inference time.

At step 708, a first conditioned latent space and a second conditioned latent space are generated. The first conditioned latent space may be referred to as a conditioned prompt (e.g., conditioned prompt 320). The first conditioned latent space may be generated by a first transformer block of a diffusion transformer model. The first transformer block may generate the first conditioned latent space based on the first prompt encoding, the second prompt encoding, and a noised latent space. The noised latent space may have a dimensionality in common with the second prompt encoding.

The first prompt encoding or an encoding derived therefrom may be combined (e.g., added) with an encoding of a timestep to generate a time conditioning signal (e.g., time conditioning 216). The time conditioning signal may include an encoding of a timestep. The first conditioned latent space may be generated by the first transformer block by using the time conditioning signal (e.g., time conditioning 216).

The second conditioned latent space may be referred to as a conditioned latent space (e.g., conditioned latent space 322). The second conditioned latent space may be generated by the first transformer block of the diffusion transformer model. The first transformer block may generate the second conditioned latent based on the first prompt encoding, the second prompt encoding, and the noised latent space. The second conditioned latent space may be generated by the first transformer block by using the time conditioning signal.

The first transformer block may perform reverse diffusion transformations on the first prompt encoding and the noised latent space. The reverse diffusion operations may be informed by the time conditioning signal. The first transformer block may use a joint self attention system (e.g., joint self attention system 310) to jointly operate on intermediate values respectively generated from the first prompt encoding and the noised latent space. Output of the joint self attention system may be further operated on in two independent series of operations to generate the first conditioned latent space and the second conditioned latent space in respective domains. Independent series of operations performed may use independent weighting (e.g., different weights).

The output from the first transformer block may be used as input to a subsequent transformer block. Any number of transformer blocks may be chained together within the diffusion transformer model. The transformer blocks may include a linear layer trained using learnable low-rank (LoRA) matrices. The last block in the chain is described with respect to step 710.

At step 710, a third conditioned latent space is generated. The third conditioned latent space may be generated by a second transformer block included in the diffusion transformer model. The second transformer block may have an architecture similar to the first transformer block. The third conditioned latent space can be generated based on output from a previous transformer block. For example, the third conditioned latent space can be generated based on the first conditioned latent space and the second conditioned latent space. The third conditioned latent space may also be generated based on the time conditioning signal generated by encoding a current timestep. Since the second transformer block may have an architecture similar to the first transformer block, the second transformer block may be configured to generate a conditioned prompt signal and a conditioned latent space signal. The second transformer may output the conditioned latent space signal to be transmitted to a decoder model (e.g., decoder model 228). The conditioned latent space signal may include an encoded representation of the content described in the prompt.

At step 712, the decoder model may be used to decode the encoded conditioned latent space representation of the content described in the prompt. The content may include one or more characteristics described in the prompt.

In some embodiments, after the content is generated, a subsequent prompt may be received by the content generation system that causes second content to be generated that is different than the first and that is based on the first prompt and/or the first content. For example, the second prompt may ask that one or more characteristics be added, further emphasized, removed, or changed.

Figure 8:
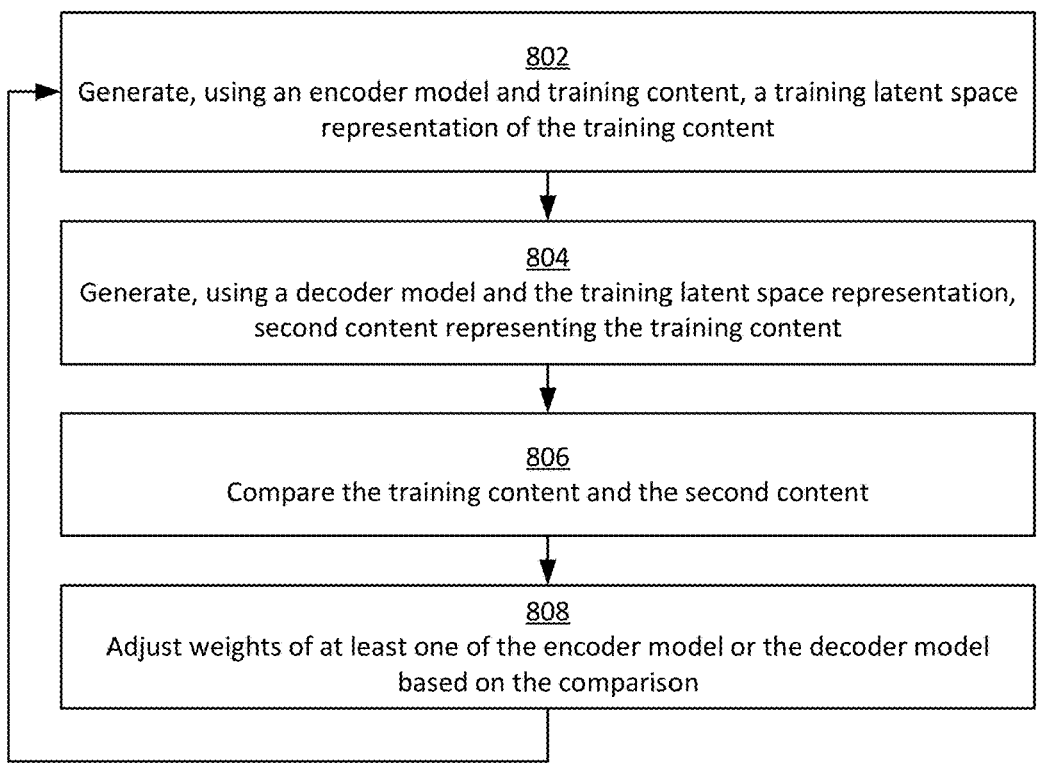
FIG. 8 illustrates an example of a process for training an encoder model and/or a decoder model, according to embodiments of the present disclosure.

FIG. 8 illustrates an example of a process 800 for training an encoder model (e.g., encoder model 516, timestep encoding model 204) and/or a decoder model (e.g., decoder model 228), according to embodiments of the present disclosure. The encoder and/or decoder model may be trained using the system described with respect to FIG. 6, above.

At step S802, an encoder model (e.g., encoder model 516) may receive training content to be used to generate a corresponding training latent space representation of the training content. The training content may be included in training data. The training content and training data has been described above in further detail. In an example, the first training content includes images and/or videos and corresponds to a training prompt.

At step S804, the decoder model may be used to generate the output content using the latent space representation of the training content.

At step S806, the output content generated by the decoder model may be compared (e.g., using an autoencoder adjustment system 608) to the training content input to the encoder model to determine how similar the content is to one another. The comparison may be performed using a loss function (e.g., a reconstruction loss function, a KL divergence loss, an adversarial loss, a perceptual loss). Additionally or alternatively, the comparison may be performed using a discriminator model, each of which have been described in further detail above. A discriminator model may be used when a watermark is added to generated images.

KL divergence loss may be used with Variational Autoencoders (VAEs). KL Divergence loss can be used to measure a difference between a learned latent distribution and a prior distribution (often a standard Gaussian). This encourages the latent space to follow a specific distribution, facilitating better generative capabilities.

Adversarial loss may be used with adversarial autoencoders (AAEs) where a discriminator network is introduced alongside the autoencoder. The adversarial loss is used to make the latent space distribution match a desired prior distribution. This may be akin to the loss used in GANs (Generative Adversarial Networks).

Instead of just pixel-wise reconstruction, perceptual loss compares the high-level features extracted from pre-trained networks (like VGG) between the original and reconstructed images. This can be useful for tasks like super-resolution, where perceptual quality is more important than exact pixel-wise accuracy.

At step S808, the weights of the encoder model and/or the decoder model may be adjusted based on the comparison performed at step S806. The weight adjustment may be performed with the goal of minimizing the loss function or otherwise causing the output content to be more similar to the training content.

Steps S802-S808 may be repeated over a number of training epochs to train or fine tune the decoder model and/or the encoder model. After the decoder model is trained, the trained decoder model may be used during inference time to generate content based on a prompt (e.g., as part of content generation system 108). The parameters of the decoder may be frozen after training and before being used during inference time. In some embodiments, after the encoder model is trained using the above process, the encoder model is used during the training process of the diffusion transformer model. The parameters of the encoder may be frozen after training and before being used during inference (e.g., while training the diffusion transformer model).

Figure 9:
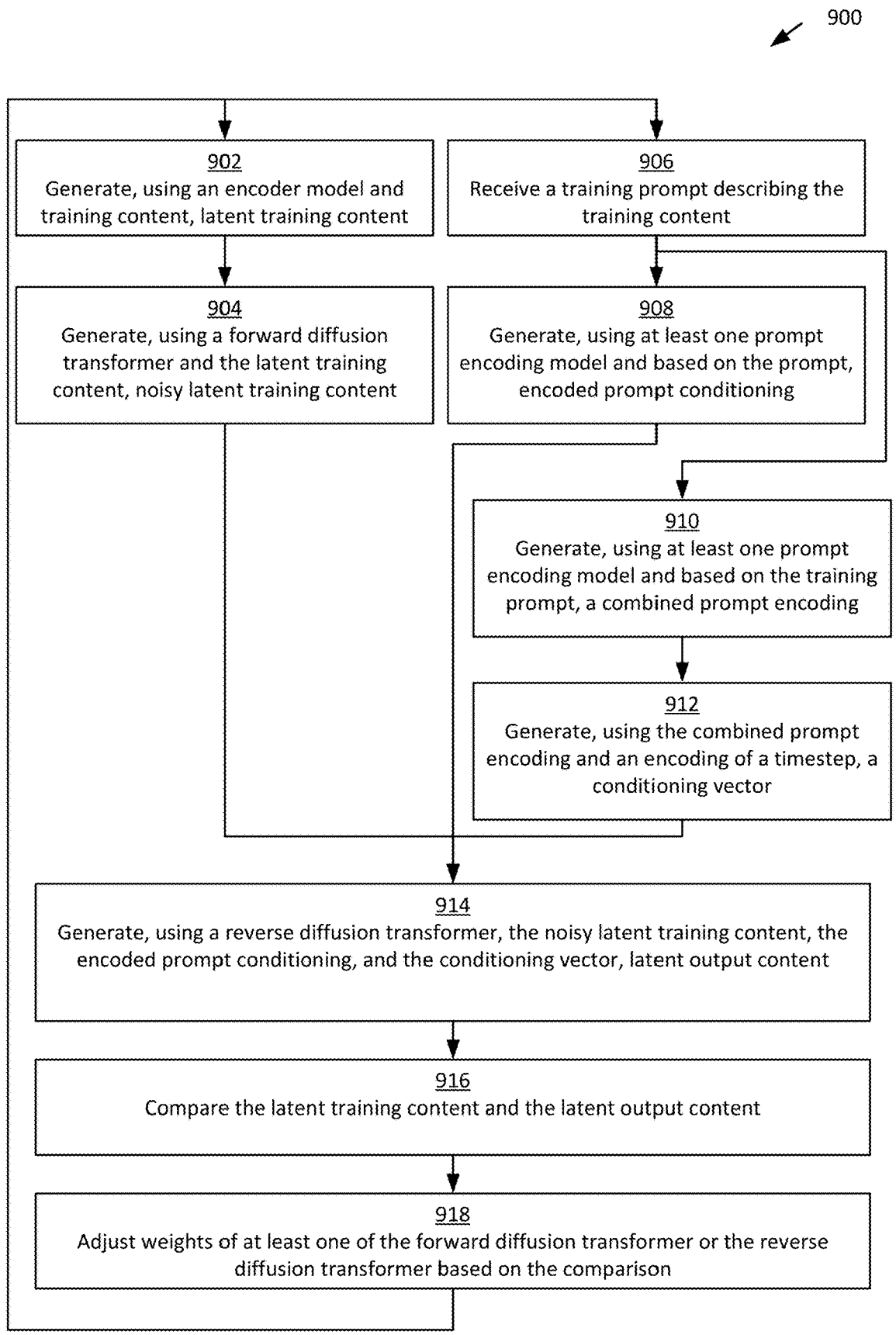
FIG. 9 illustrates an example of a process for training a diffusion transformer model, according to embodiments of the present disclosure.

FIG. 9 illustrates an example of a process 900 for training a diffusion transformer model, according to embodiments of the present disclosure. The diffusion transformer model may include a forward diffusion transformer (e.g., forward diffusion transformer 520) and a reverse diffusion transformer (e.g., reverse diffusion transformer 224). The reverse diffusion transformer may be used during inference time by a content generation system (e.g., content generation system 108) described above.

At step S902, training content may be received by an encoder model (e.g., encoder model 516) and the encoder model may generate latent training content of the training content. The training content may be included in training data and may correspond to a training prompt. The training content, data, and prompt have been described above in further detail.

At step S904, the latent training content of the training content may be input to the forward diffusion transformer (e.g., a system or a model) to cause the forward diffusion transformer to generate noisy latent training content (e.g., noisy latent training content 522).

At step S906, a training prompt (e.g., training prompt 502) corresponding (e.g., describing attributes of the training content) to the first training content may be received for use at step S908 and/or step S910. The training prompt may be included in the set of training data. The set of training data may be the same set of training data used by the encoder model at step S902. In some embodiments, the training prompt describes desired characteristics of audio to be generated. For example, the desired characteristics may include a style, a color, a subject, a mood, a texture, a contrast, a depth, a movement, a saturation, a focus, a perspective, a narrative, and/or another characteristic. The training prompt may include audio, images, video, and/or voice to be used for generating latent output content (e.g., latent output content 526). The training prompt may include content to be added to and/or altered by the content generation system.

At step S908, encoded prompt conditioning (e.g., encoded prompt conditioning 506) may be generated. The encoded prompt conditioning may be output from at least one prompt encoding model. The encoded prompt conditioning may include a combination of outputs from the at least one prompt encoding model. The at least one prompt encoding model may be included in a set of one or more prompt encoding models (e.g., a second set of prompt encoding model(s) 504). The encoded prompt conditioning may be transmitted to a reverse diffusion transformer model (e.g., reverse diffusion transformer 224) to be used in the training of the reverse diffusion transformer.

At step S910, a combined prompt encoding (e.g., combined encoding 510) may be generated. The combined prompt encoding may be generated using one or more encoding models from a set of one or more encoding models (e.g., a first set of prompt encoding models 508). Output from encoding models included in the set of one or more encoding models may be combined to generate the combined prompt encoding. The combined prompt encoding may be transmitted to an encoding addition system to be added with an encoded timestep. The encoded timestep may be generated by encoding a timestep using a timestep encoding model (e.g., timestep encoding model 204). After the combined prompt encoding is added with the timestep encoding to generate a conditioning vector. The conditioning vector may be used by a reverse diffusion transformer (e.g., reverse diffusion transformer 224) to generate latent output content.

At step S912, the reverse diffusion transformer may use the noisy latent training content, the conditioning vector, and the encoded prompt conditioning to generate the latent output content. The reverse diffusion model may include one or more transformer blocks that operate in two separate domains to perform reverse diffusion in each domain with separate weighting but while also performing joint self attention operations (e.g., QKV attention, multihead attention) between the two domains. During the joint self attention operation, a prompt embedding may be used to help the model focus on specific portions of an image embedding and further capture contextual relationships between the prompt embedding and the prompt embedding.

At step S914, the noisy latent training content generated at step S904, the first encoded prompt conditioning generated at step S908, and/or the conditioning vector generated at step S912 may be input to a reverse diffusion transformer. The reverse diffusion transformer may use the inputs to generate latent output content (e.g., latent output content 526). The reverse diffusion transformer may use the inputs to condition the performance of the reverse diffusion transformer as described above (e.g., with respect to FIG. 2-5). The reverse diffusion transformer may be configured to output latent output content in a conditioned latent space. The generated latent output content may be representative of the training content.

At step S916, the latent output content generated at step S914 may be compared to the latent training content generated at step S902. The comparison may be performed by a transformer adjustment system (e.g., transformer adjustment system 528). A loss function may be used to compare the latent training content and the latent output content.

At step S918, a transformer weight adjustment signal may be transmitted to the forward diffusion transformer and/or the reverse diffusion transformer (e.g., by the transformer adjustment system) based on the comparison performed at step S916. Step 918 may be referred to as back propagation. Step S918 can be performed in an effort to minimize a loss function used during the training process 900 and thereby increase the reverse diffusion transformer's accuracy.

Steps S902-S918 may be repeated over a number of training epochs to train or fine tune the reverse diffusion transformer and/or forward diffusion transformer. As training continues, the noisy latent training content generated by the forward diffusion transformer may become progressively noisier (e.g., such that the noise becomes closer to representing a gaussian distribution). As training continues, the reverse diffusion transformer may become more accurate at correctly (is similar to the latent training content) generating latent output content based on the noisy latent training content, time conditioning, and first encoded prompt conditioning it receives as input. After the reverse diffusion transformer is trained, the trained reverse diffusion transformer may be used during inference time to generate content based on a prompt (e.g., as part of content generation system 108).

As a result of the training process, the content generation system can obtain a reverse diffusion transformer that uses separate and respective weights for two modalities and a bidirectional flow of information between tokens for each modality to generate content with improved prompt comprehension and/or typography.

Figure 10:
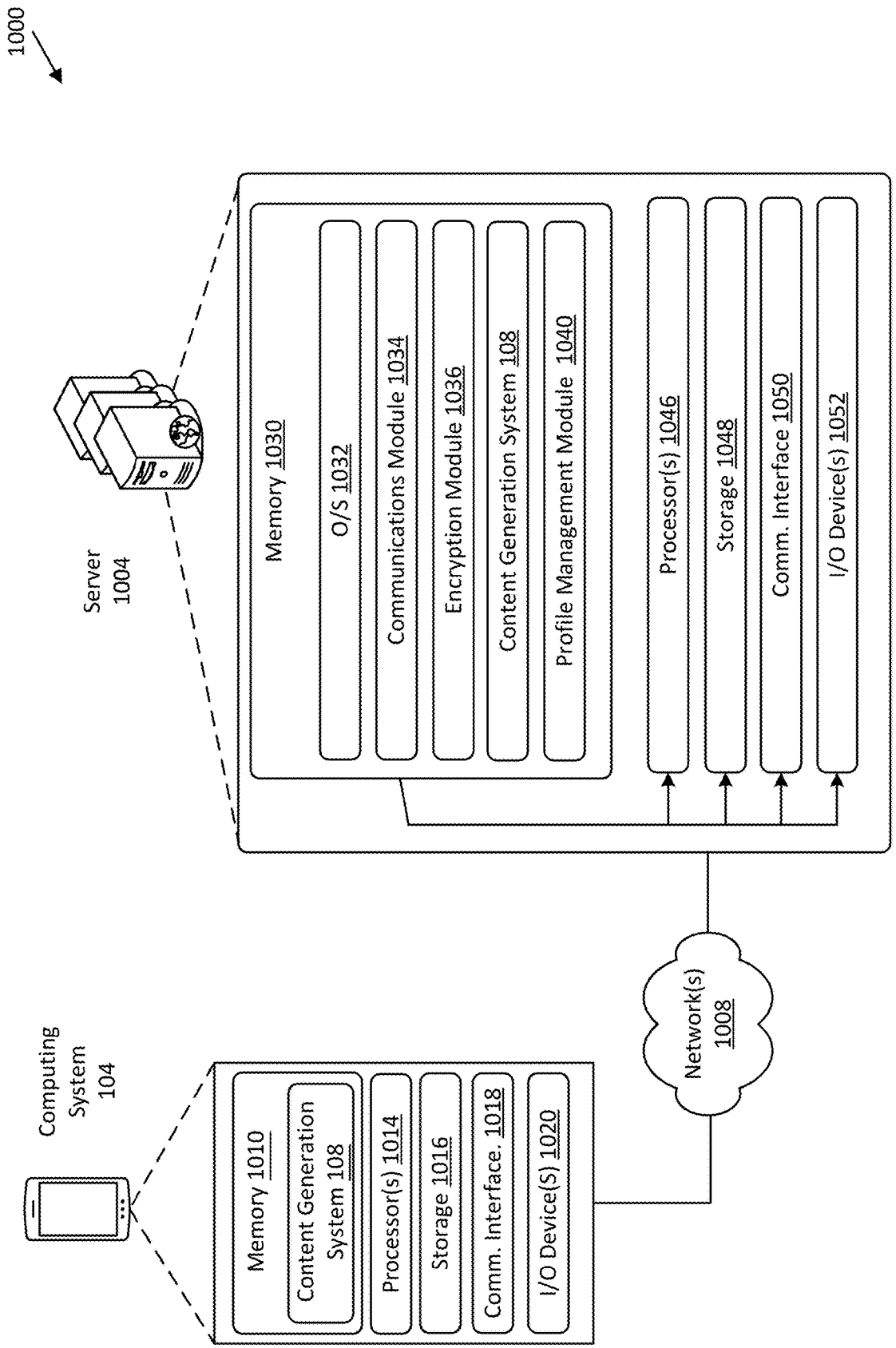
FIG. 10 is a simplified block diagram illustrating an example architecture of a system used to train and/or use the models and systems described herein, according to some embodiments.

FIG. 10 is a simplified block diagram illustrating an example architecture of a system 1000 used to train and/or use the models and systems described herein, according to some embodiments.

The system 1000 includes a computing system 104, a network 1008, and a server 1004. The computing system 104 may be similar to any of the user devices and/or computing systems described herein. The server 1004 may correspond to one or more server computers (e.g., a server cluster) of a cloud computing platform, as described herein.

The network 1008 may include any suitable communication path or channel such as, for instance, a wire or cable, fiber optics, a telephone line, a cellular link, a radio frequency (RF) link, a WAN or LAN network, the Internet, or any other suitable medium. The network 1008 may include any one or a combination of many different types of networks, such as cable networks, the Internet, wireless networks, cellular networks, and other private and/or public networks. The network may use infrared, ultra-wideband (UWB), Bluetooth (BT), Bluetooth low energy (BTLE), Wi-Fi, and/or radio communication techniques.

Turning to each element in further detail, the computing system 104 may be any suitable computing device (e.g., a mobile phone, tablet, personal computer (PC), smart glasses, a smart watch, etc.). The computing system 104 has at least one memory 1010, one or more processing units (or processor(s)) 1014, a storage unit 1016, a communications interface 1018, and an input/output (I/O) device(s) 1020.

The processor(s) 1014 may be implemented as appropriate in hardware, computer-executable instructions, firmware, or combinations thereof. Computer-executable instruction or firmware implementations of the processor(s) 1014 may include computer-executable or machine executable instructions written in any suitable programming language to perform the various functions described.

The memory 1010 may store program instructions that are loadable and executable on the processor(s) 1014, as well as data generated during the execution of these programs. Depending on the configuration and type of computing system 104, the memory 1010 may be volatile (such as random access memory (RAM)) and/or non-volatile (such as read-only memory (ROM), flash memory, etc.). In some implementations, the memory 1010 may include multiple different types of memory, such as static random access memory (SRAM), dynamic random access memory (DRAM) or ROM. The computing system 104 may also include additional storage 1016, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 1016 may be utilized to store audio, video, images, and/or text files.

The computing system 104 may also contain the communications interface 1018 that allows the user device 1002 to communicate with the server, user terminals, and/or other devices on the network(s) 1008. The computing system 104 may also include I/O device(s) 1020, such as for enabling connection with a keyboard, a mouse, a pen, a voice input device, a touch input device, a display, speakers, a printer, and/or other components the computing system 104 may include.

Turning to the contents of the memory 1010 in more detail, the memory 1010 may include an operating system and one or more application programs or services for implementing the features disclosed herein, including a content generation system 108 or a system for training one or more of the models used in the content generation system 108.

It should be understood that one or more functions of the content generation system 108 may be performed by the computing system 104 and/or server 904.

In some embodiments, as described above the remote server 1004 may correspond to a cloud computing platform. The remote server 1004 may perform one or more functions, including, for example: receiving a prompt; generating a first prompt encoding; generating a second prompt encoding; generating a first conditioned latent space and a second conditioned latent space based on the prompt encoding(s) and a first latent space; generating a third conditioned latent space based on the first conditioned latent space and the second conditioned latent space; and/or generating content based on the third conditioned latent space. Remote server 1004 may transmit the content to computing system 104. The remote server 1004 may include a credential generation module, I/O devices, and/or communications interfaces, etc.

Turning to the contents of the memory 1030 in more detail, the memory 1030 may include an operating system 1032 and one or more application programs or services for implementing the features disclosed herein, including a communications module 1034, an encryption module 1036, the content generation system 108, and/or a profile management module 1040.

The communications module 1034 may comprise code that causes the processor 1046 to receive prompts, generate embeddings, train models, transmit content, and/or otherwise communicate with other system components. For example, the communications module 1034 may receive prompts and transmit content to the computing system 104.

The encryption module 1036 may comprise code that causes the processor 1046 to encrypt and/or decrypt messages. For example, the encryption module 1036 may receive encrypted data (e.g., prompts) from the computing system 104. The encryption module 1036 may include any suitable encryption algorithms to encrypt data. Suitable data encryption algorithms may include Data Encryption Standard (DES), tripe DES, Advanced Encryption Standard (AES), etc. It may also store (e.g., in storage unit 1048) encryption keys (e.g., encryption and/or decryption keys) that can be used with such encryption algorithms. The encryption module 1036 may utilize symmetric or asymmetric encryption techniques to encrypt and/or verify data. For example, the computing system 104 may contain similar code and/or keys as encryption module 1036 that is suitable for encrypting/decrypting data communications with the computing system 104 (and/or server 1004).

The profile management module 1040 may comprise code that causes the processor 946 to maintain and store profiles of users and/or user devices. For example, the profile management module 940 may receive users and/or devices allowed to use the content generation system 108 and/or train the content generation system 108. The profile management module 1040 may keep track of users and/or devices associated with prompts and/or generated content so that when the users and/or devices use the server 1004 again, the prompts and/or generated content can be transmitted to the users and/or devices (e.g., displayed as content generation history). The profile management module 1040 may also include information relating to which users and/or user devices have what permissions, etc.

The processing depicted in FIGS. 7-9 (and/or described with respect to FIGS. 1-6), and any other FIGS. may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented herein are intended to be illustrative and non-limiting. Although FIGS. 7-9, and other FIGS., depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in FIGS. 7-9, and other FIGS. may include a greater number or a lesser number of steps than those depicted in the respective FIGS.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing programs/code, or portions of programs/code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more storage media storing instructions; and
   one or more processors configured to execute the instructions to cause the system to:
      receive a prompt describing a desired characteristic of an image;
      generate, using a set of encoding models, a prompt encoding based on the prompt;
      generate, using a first transformer block of a diffusion transformer model, a first prompt embedding and a first image embedding based on the prompt encoding and a noise input;
      generate, using a second transformer block of the diffusion transformer model, a second image embedding based on the first image embedding and the first prompt embedding; and
      generate the image based on the second image embedding.

2. The system of claim 1, wherein the set of encoding models comprises:
   a first subset of encoding models; and
   a second subset of encoding models different from the first subset of encoding models.

3. The system of claim 2, wherein the first subset of encoding models includes a different number of encoding models than the second subset of encoding models.

4. The system of claim 1, wherein the set of encoding models includes at least one of: a first text encoder jointly trained with an image encoder or a second text encoder that is trained as a text-to-text encoder.

5. The system of claim 1, wherein the diffusion transformer model is trained using prompt embeddings generated by a second set of encoding models that is different than the set of encoding models.

6. The system of claim 1, wherein generating the first prompt embedding is further based on a first weight included in a first set of weights associated with a first domain of the first prompt embedding, and generating the first image embedding is further based on a second weight included in a second set of weights associated with a second domain of the first image embedding.

7. The system of claim 6, wherein the diffusion transformer model is trained based on the instructions which further cause the system to:
generate noisy latent input content using input content;
generate latent output content using the noisy latent input content and a third prompt encoding which corresponds to the noisy latent input content; and
adjust at least one of the first weight or the second weight based on comparing the noisy latent input content and the latent output content.

8. The system of claim 1, wherein generating the first image embedding or the first prompt embedding includes applying an attention operation to an intermediate value generated based on at least one of the noise input or the prompt encoding.

9. A computer-implemented method comprising:
receiving a prompt describing a desired characteristic of an image;
generating, using a set of encoding models, a prompt encoding based on the prompt;
generating, using a first transformer block of a diffusion transformer model, a first prompt embedding and a first image embedding based on the prompt encoding and a noise input;
generating, using a second transformer block of the diffusion transformer model, a second image embedding based on the first image embedding and the first prompt embedding; and
generating the image based on the second image embedding.

10. The computer-implemented method of claim 9, wherein generating the first prompt embedding further comprises:
generating a first vector space using the prompt encoding and an encoding of a timestep;
generating a second vector space using the prompt encoding; and
generating the first prompt embedding using the first vector space, the second vector space, and the noise input; and
wherein generating the first image embedding further comprise:
generating the noise input using a positional encoding and a noisy pixel encoding; and
generating the first image embedding using the first vector space, the second vector space, and the noise input.

11. The computer-implemented method of claim 10, wherein the timestep is given more weight when the timestep is an intermediate time step.

12. The computer-implemented method of claim 9, wherein generating the first prompt embedding further comprises:
generating, using more than one encoding model included in the set of encoding models, text conditioning including encodings from at least two encoding models.

13. The computer-implemented method of claim 9, wherein generating the first prompt embedding and the first image embedding comprises:
generating a first normalized intermediate value of the first prompt embedding;
generating a second normalized intermediate value of the first image embedding;
joining the first normalized intermediate value and the second normalized intermediate value; and
performing a self attention operation on the joined values.

14. The computer-implemented method of claim 13, wherein the prompt encoding is a first prompt encoding and generating the first prompt encoding comprises:
generating a second prompt encoding using the prompt as input to a subset of encoding models included in the set of encoding models;
generating a third prompt encoding using the prompt as input to a second subset of encoding models included in the set of encoding models; and
generating the first prompt encoding by combining a portion of the second prompt encoding and the third prompt encoding.

15. One or more non-transitory computer-readable storage media storing instructions that, upon execution executable by one or more processors of a system, cause the system to perform operations comprising:
receiving a prompt describing a desired characteristic of an image;
generating, using a set of encoding models, a prompt encoding based on the prompt;
generating, using a first transformer block of a diffusion transformer model, a first prompt embedding and a first image embedding based on the prompt encoding and a noise input;
generating, using a second transformer block of the diffusion transformer model, a second image embedding based on the first image embedding and the first prompt embedding; and
generating the image based on the second image embedding.

16. The non-transitory computer-readable storage medium of claim 15, wherein training the diffusion transformer model comprises:
pretraining the diffusion transformer model using images of a first size; and
fine tuning the diffusion transformer model using at least:
images with a second size greater than the first size or images with mixed aspect ratios.

17. The non-transitory computer-readable storage medium of claim 15, wherein the first prompt embedding and the first image embedding have a common dimensionality.

18. The non-transitory computer-readable storage medium of claim 15, wherein the first transformer block and the second transformer block each include a linear layer trained using learnable low-rank (LoRA) matrices.

19. The non-transitory computer-readable storage medium of claim 15, wherein the diffusion transformer model is trained using training data including a set of images and a set of prompts, the set of prompts including a synthetic prompt generated using a corresponding image from the set of images.

20. The non-transitory computer-readable storage medium of claim 15, wherein the diffusion transformer model includes a rectified flow model and trained using a logit-normal distribution.

\* \* \* \* \*